US008424002B2

(12) United States Patent
Akamatsu et al.

(10) Patent No.: US 8,424,002 B2
(45) Date of Patent: Apr. 16, 2013

(54) METHOD, SYSTEM AND PROGRAM OF OUTPUTTING INFORMATION

(75) Inventors: Yuji Akamatsu, Yokohama (JP); Shuji Fujino, Ayase (JP)

(73) Assignee: Hitachi, Ltd., Tokyo (JP)

( * ) Notice: Subject to any disclaimer, the term of this patent is extended or adjusted under 35 U.S.C. 154(b) by 1488 days.

(21) Appl. No.: 11/376,093

(22) Filed: Mar. 16, 2006

(65) Prior Publication Data
US 2007/0136727 A1 Jun. 14, 2007

(30) Foreign Application Priority Data
Dec. 14, 2005 (JP) ................................. 2005-360199

(51) Int. Cl.
G06F 9/46 (2006.01)
(52) U.S. Cl.
USPC ........... 718/100; 719/313; 719/314; 719/318; 715/738; 709/229
(58) Field of Classification Search .......................... None
See application file for complete search history.

(56) References Cited

U.S. PATENT DOCUMENTS

| 5,592,675 | A | * | 1/1997 | Itoh et al. | 713/300 |
|---|---|---|---|---|---|
| 5,655,081 | A | * | 8/1997 | Bonnell et al. | 709/202 |
| 6,026,500 | A | * | 2/2000 | Topff et al. | 714/26 |
| 6,157,378 | A | * | 12/2000 | Bormann et al. | 715/733 |
| 6,170,010 | B1 | * | 1/2001 | Hirata et al. | 709/223 |
| 6,466,973 | B2 | * | 10/2002 | Jaffe | 709/223 |
| 6,646,564 | B1 | * | 11/2003 | Azieres et al. | 340/679 |
| 6,727,926 | B1 | * | 4/2004 | Utsuki et al. | 715/853 |
| 6,750,766 | B1 | * | 6/2004 | Heitner et al. | 340/525 |
| 6,966,033 | B1 | * | 11/2005 | Gasser et al. | 715/738 |
| 7,376,898 | B1 | * | 5/2008 | Yehuda et al. | 715/741 |
| 2002/0083003 | A1 | * | 6/2002 | Halliday et al. | 705/52 |
| 2002/0169866 | A1 | * | 11/2002 | Lim et al. | 709/223 |
| 2002/0184535 | A1 | * | 12/2002 | Moaven et al. | 713/202 |
| 2003/0069648 | A1 | * | 4/2003 | Douglas et al. | 700/2 |
| 2003/0093619 | A1 | * | 5/2003 | Sugino et al. | 711/114 |
| 2004/0003294 | A1 | * | 1/2004 | Moore | 713/202 |
| 2004/0049531 | A1 | * | 3/2004 | Honda et al. | 709/201 |
| 2004/0169677 | A1 | * | 9/2004 | Utsuki et al. | 345/734 |
| 2004/0249937 | A1 | | 12/2004 | Tachihara et al. | |
| 2005/0159969 | A1 | * | 7/2005 | Sheppard | 705/1 |
| 2006/0017975 | A1 | * | 1/2006 | Ly et al. | 358/1.18 |
| 2006/0150032 | A1 | * | 7/2006 | Furukawa et al. | 714/47 |

FOREIGN PATENT DOCUMENTS

| JP | 10-083382 | 3/1998 |
|---|---|---|
| JP | 11-143742 | 5/1999 |
| JP | 2000-181756 | 6/2000 |
| JP | 2004-046900 | 2/2004 |

\* cited by examiner

*Primary Examiner* — Lechi Truong
*Assistant Examiner* — Shih-Wei Kraft
(74) *Attorney, Agent, or Firm* — Antonelli, Terry, Stout & Kraus, LLP.

(57) ABSTRACT

An information output method for displaying information of a computer system executing a plurality of tasks including: reading out task construction information corresponding to a task executed by the computer system from a storage device and displaying by an output device the task construction information in a task construction display area inside an output area; reading out logical construction information associated with the task construction information from the storage device and displaying by the output device the logical construction information in a logical construction display area inside the output area; and reading out physical construction information associated with the logical construction information from the storage device and displaying by the output device the physical construction information in a physical construction display area inside the output area.

3 Claims, 28 Drawing Sheets

FIG. 3

| No. | USER NAME | TASK CON-STRUCTION DISPLAY | LOGICAL CON-STRUCTION DISPLAY | PHYSICAL CON-STRUCTION DISPLAY | | OBJECT TASK |
|---|---|---|---|---|---|---|
| 1 | userA | ◎ | ○ | × | LOGICAL | WORKING HOURS MANAGEMENT SYSTEM DOCUMENT BATCH TASK |
| 2 | userB | ◎ | ○ | S | PHYSICAL | |
| 3 | userC | ◎ | ◎ | × | LOGICAL | WORKING HOURS MANAGEMENT SYSTEM |
| 4 | userD | ○ | ◎ | × | LOGICAL | DOCUMENT BATCH TASK |
| ⋮ | ⋮ | ⋮ | ⋮ | ⋮ | | |

| No. | SCREEN ID | TASK SERVICE NAME | USER GROUP NAME | LOG-IN STATUS |
|---|---|---|---|---|
| 1 | G001 | WORKING HOURS MANAGEMENT SYSTEM | userA | UNDER LOG-IN |
| 2 | G002 | DOCUMENT BATCH TASK | groupA | UNDER LOG-OUT |
| ⋮ | ⋮ | | | |

| No. | TASK SERVICE NAME | TASK CONSTRUCTION |
|---|---|---|
| 1 | WORKING HOURS MANAGEMENT SYSTEM | WORKING HOURS MANAGEMENT SYSTEM WEB, WORKING HOURS MANAGEMENT SYSTEM AP, WORKING HOURS MANAGEMENT SYSTEM DB |
| 2 | DOCUMENT BATCH TASK | BACKUP EXECUTION BATCH, DIFFERENCE OUTPUT BATCH |
| ⋮ | ⋮ | |

| No. | TASK ELEMENT ID | TASK CON-STRUCTION ELEMENT | TASK ELEMENT RELATION INFORMATION | LOGICAL ELEMENT RELATION INFORMATION |
|---|---|---|---|---|
| 1 | B001 | WORKING HOURS MANAGEMENT SYSTEM WEB | 002 | WORKING HOURS MANAGEMENT WEB SERVER A |
| 2 | B002 | WORKING HOURS MANAGEMENT SYSTEM AP | 003 | WORKING HOURS MANAGEMENT AP SERVER A, WORKING HOURS MANAGEMENT AP SERVER B, WORKING HOURS MANAGEMENT AP SERVER C |
| 3 | B003 | WORKING HOURS MANAGEMENT SYSTEM DB | — | WORKING HOURS MANAGEMENT DB SERVER A |
| 1 | B004 | BACKUP EXECUTION BATCH | 006 | |
| 2 | B005 | DIFFERENCE OUTPUT BATCH | — | |

FIG. 6

| No. | LOGICAL ELEMENT ID | LOGICAL SERVER NAME | TASK AP CONTROL NAME | TASK AP NAME | IP ADDRESS | LOGICAL ELEMENT RELATION INFORMATION |
|---|---|---|---|---|---|---|
| 1 | L001 | WORKING HOURS MANAGEMENT WEB SERVER | Web3tirel | Web1 | 10,208,40,10 | 002,003,004 |
| 2 | L002 | WORKING HOURS MANAGEMENT AP SERVER A | Web3tirel | AP1 | 10,208,40,11 | 005 |
| 3 | L003 | WORKING HOURS MANAGEMENT AP SERVER B | Web3tirel | AP1 | 10,208,40,12 | 005 |
| 4 | L004 | WORKING HOURS MANAGEMENT AP SERVER C | Web3tirel | AP1 | 10,208,40,13 | 005 |
| 5 | L005 | WORKING HOURS MANAGEMENT DB SERVER A | DBMS | DB1 | 10,208,40,14 | — |
| ⋮ | ⋮ | | ⋮ | ⋮ | ⋮ | ⋮ |

FIG. 7

| No. | HOST NAME | IP ADDRESS | AGENT PROCESSING EXISTENCE/ ABSENCE FLAG | TASK AP CONTROL NAME | CLUSTER | STATUS |
|---|---|---|---|---|---|---|
| 1 | Host_A | 10,208,40,10 | AGENT: YES | Beleh1 | NO | — |
| 2 | Host_B | 10,208,40,11 | AGENT: YES | Web3tirel | NO | — |
| 3 | Host_C | 10,208,40,12 | AGENT: YES | Web3tirel | NO | — |
| 4 | Host_D | 10,208,40,13 | AGENT: YES | Web3tirel | NO | — |
| 5 | Host_E | 10,208,40,14 | AGENT: YES | DBMS1 | YES | OPERATION |
| 7 | Host_F | 10,208,40,15 | AGENT: YES | DBMS1 | YES | STANDBY |
| ⋮ | ⋮ | ⋮ | ⋮ | ⋮ | ⋮ | ⋮ |

FIG. 31

| WORKING HOURS MANAGEMENT SYSTEM<br>—WORKING HOURS MANAGEMENT Web<br>—WORKING HOURS MANAGEMENT AP<br>—WORKING HOURS MANAGEMENT DB | WORKING HOURS MANAGEMENT Web ○ — WORKING HOURS MANAGEMENT AP △ — WORKING HOURS MANAGEMENT DB □ |
|---|---|
| LOGICAL CONSTRUCTION<br>—WORKING HOURS MANAGEMENT Web SERVER A<br>—WORKING HOURS MANAGEMENT AP SERVER A<br>—WORKING HOURS MANAGEMENT AP SERVER B<br>—WORKING HOURS MANAGEMENT AP SERVER C<br>—WORKING HOURS MANAGEMENT DB SERVER A | WORKING HOURS MANAGEMENT Web SERVER A ○ — [WORKING HOURS MANAGEMENT AP SERVER A △, WORKING HOURS MANAGEMENT AP SERVER B △, WORKING HOURS MANAGEMENT AP SERVER C △] — WORKING HOURS MANAGEMENT DB SERVER A □ |
| ◆TASK CONSTRUCTION<br>◆LOGICAL CONSTRUCTION<br>◇PHYSICAL CONSTRUCTION | WORKING HOURS MANAGEMENT AP SERVER A: HOST(Host_B) IS ACTIVATED.<br>WORKING HOURS MANAGEMENT AP SERVER B: HOST(Host_C) IS ACTIVATED.<br>WORKING HOURS MANAGEMENT AP SERVER C: HOST(Host_D) IS ACTIVATED.<br>WORKING HOURS MANAGEMENT AP SERVER A: SERVICE OF WORKING HOURS MANAGEMENT AP IS ACTIVATED. |

FIG. 34

| No. | GENERATION PARTY | TIME | MESSAGE | EVENT KIND |
|---|---|---|---|---|
| 1 | Host_E | 8:33:05 | HOST (Host_E) IS ACTIVATED. | PHYSICAL |
| 2 | Host_E | 8:33:20 | SERVICE OF WORKING HOURS MANAGEMENT DB IS ACTIVATED. | TASK |
| 3 | Host_B | 8:33:35 | HOST (Host_B) IS ACTIVATED. | PHYSICAL |
| 4 | Host_C | 8:33:36 | HOST (Host_C) IS ACTIVATED. | PHYSICAL |
| 5 | Host_D | 8:33:36 | HOST (Host_D) IS ACTIVATED. | PHYSICAL |
| 6 | Host_B | 8:33:36 | SERVICE OF WORKING HOURS MANAGEMENT AP IS ACTIVATED. | TASK |
| 7 | Host_A | 8:33:36 | HOST (Host_A) IS ACTIVATED | TASK |
| 8 | Host_A | 8:33:36 | SERVICE OF WORKING HOURS MANAGEMENT WEB IS ACTIVATED. | TASK |
| 9 | Host_Bat_A | 8:33:36 | HOST (Host_Bat_A) IS ACTIVATED. | TASK |
| 9 | Host_Bat_B | 8:33:36 | HOST (Host_Bat_B) IS ACTIVATED. | TASK |
| 9 | Host_Bat_A | 8:33:36 | SLIP TRANSFER IS STARTED. | TASK |
| 10 | Host_Bat_A | 8:33:36 | SLIP TRANSFER IS STARTED. | TASK |

METHOD, SYSTEM AND PROGRAM OF OUTPUTTING INFORMATION

INCORPORATION BY REFERENCE

The present application claims priority from Japanese application JP2005-360199 filed on Dec. 14, 2005, the content of which is hereby incorporated by reference into this application.

BACKGROUND OF THE INVENTION

This invention relates to an information output technology for managing the condition of a task executed by a computer system by using a pair of a physical construction and a logical construction. More particularly, the invention relates to a technology that will be effective when applied to an information output technology for controlling an output of system information in accordance with authority and viewpoint of a system operation manager.

In operation management of a computer system, management and monitor is made by using names allocated to IT resources existing inside the system (computer devices such as server, storage device, network device, database, etc). To grasp the range of influences of a system failure on tasks, however, it has been required to assort the IT resources necessary for the execution of the tasks into logics and groups from the business viewpoints such as task, organization and application and to manage and monitor them from the viewpoint of the tasks under the logical names.

Therefore, the monitor system is defined as a task layer constituting a task program that is executed by the system, a logical layer defining and managing the IT resources necessary for the execution of the tasks by logical names and a physical layer defining the IT resources executing the tasks. It has become thus possible to manage and monitor the system from the viewpoints corresponding to authority of a manager such as an infrastructure manager who manages the IT resources and a task manager who manages the tasks.

In a maintenance assistance apparatus for a distributed system operation which guarantees effective, economical and planned maintenance and operation of a distributed system, there is a technology that acquires information of the task to which an end user attaches the greatest importance and its accompanying information and insures a correct execution of the maintenance and operation that should be preferentially made for the end user (JP-A-10-83382, for example).

The monitor screen has been divided for each layer in the prior art technologies. To grasp the content of a failure and the range of influences brought forth by the failure, therefore, it has been necessary to switch and check the monitor screens of a plurality of layers. It has also been difficult to grasp the relation among the screens.

When the IT resources relating to the tasks are monitored, means is available that defines in advance physical information of the IT resources relating to the tasks and reports the failure to the manager of the task system at the time of occurrence of the failure of the IT resources. However, it is necessary for the user to set beforehand the information of the IT resources relating to the task, and when the IT resources are changed with the system change, there occurs the problem that monitor setting of the tasks is affected, too.

SUMMARY OF THE INVENTION

It is an object of the invention to provide a technology that can solve the problems described above and can efficiently grasp the content of a failure and the range of influences of the failure when tasks are monitored in a computer system executing a plurality of tasks or when such a failure develops.

In an information display system for displaying information of a computer system executing a plurality of tasks, the invention displays task construction information, logical construction information and physical construction information corresponding to the tasks in a task construction display area, a logical construction display area and a physical construction display area inside an output area, respectively.

In an information display system according to the invention, user management information is generated as information representing tasks each user can look up and is managed by a user management processing unit. Task construction information corresponding to tasks, logical construction information associated with the task construction information and physical construction information associated with the logical construction information are generated and these kinds of information are managed by a construction management processing unit.

When receiving an information display request of a computer system executing a plurality of tasks, a screen control processing unit of the information display system acquires the name of a task service that a log-in user can look up from user management information, and then displays the task construction information in a task construction display area inside the output screen.

Next, the screen control processing unit acquires logical construction information associated with the task construction information by the construction management processing unit. The construction management processing unit acquires physical construction information associated with logical construction information and displays this physical construction information in a physical construction display area.

As described above, the information display system according to the invention displays the task construction information, the logical construction information and the physical construction information corresponding to the tasks that the log-in user can look up in the construction display areas corresponding to these kinds of construction information, respectively. Therefore, it is possible to altogether display associated information of the task layer, the logical layer and the physical layer in the output area and to assist grasping the content of each kind of information and the range of influences at the time of failure by the user.

BRIEF DESCRIPTION OF THE DRAWINGS

FIG. 3 shows a detail of user management information 112 according to the embodiment of the invention;

FIG. 4 shows a detail of screen management information 111 according to the embodiment of the invention;

FIG. 5 shows a detail of task construction information 113 according to the embodiment of the invention;

FIG. 6 shows a detail of logical construction information 114 according to the embodiment of the invention;

FIG. 7 shows a detail of physical construction information 115 according to the embodiment of the invention;

FIG. 31 shows a screen display example when construction information of an embodiment is selected;

FIG. 34 shows a data example of an event DB 116 according to the embodiment.

DESCRIPTION OF THE EMBODIMENTS

An information display system according to an embodiment of the invention for displaying information of a computer system executing a plurality of tasks will be hereinafter explained.

Figure 1:
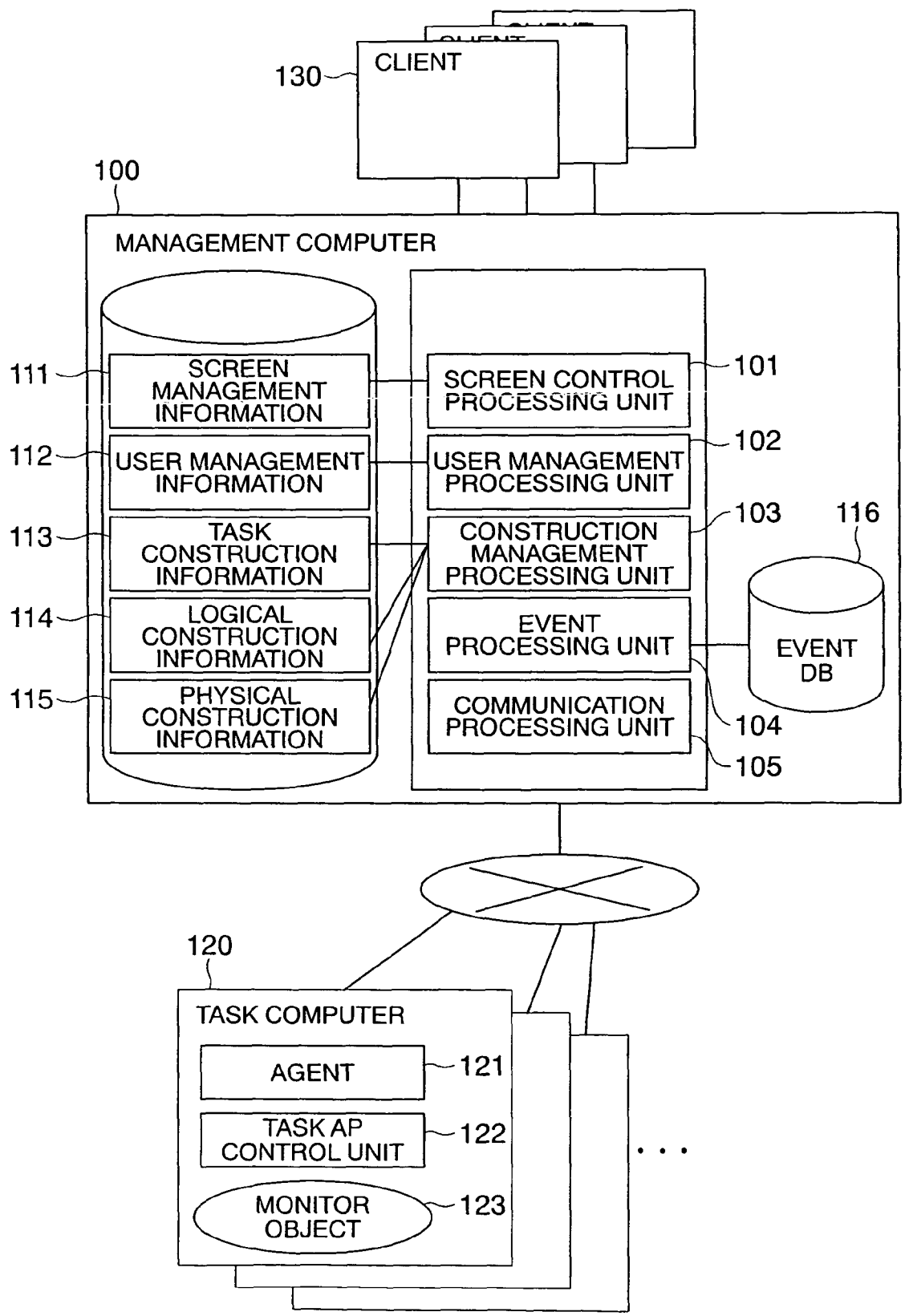
FIG. 1 shows an overall construction of an information display system according to an embodiment of the invention.

FIG. 1 shows an overall construction of an information display system according to an embodiment of the invention. As shown in FIG. 1, a management computer 100 includes a screen control processing unit 101, a user management processing unit 102, a construction management processing unit 103, an event processing unit 104 and a communication processing unit 105.

The screen control processing unit 101 is a processing unit that holds screen management information 111 and manages control of output information displayed for a user on the basis of a screen operation of the user or an event acquired. The user management processing unit 102 is a processing unit that holds user management information and manages reference authority of the user to the task. The construction management processing unit 103 is a processing unit that holds task construction information 113, logical construction information 114 and physical construction information 115, acquires construction of an IT resource or association of the task construction information from a task computer 120 and always manages the latest construction. The event processing unit 104 is a processing unit that holds an event DB 116 and manages events from the task computer 120.

The task computer 120 includes an agent 121 for transmitting events and construction information, a task AP control unit 122 for managing task execution, and a monitor object 123 such as an operating system (hereinafter called "OS"), a task application program (hereinafter called "task AP"), a batch as one form of a task application program (hereinafter called "task AP"), a database management system and services.

It will be assumed in this embodiment that a program for causing the computer to operate as the processing unit described above is recorded in a recording medium such as a CD-ROM, stored in a magnetic disk and loaded to a memory and executed. The recording medium for recording the program may be recording media other than the CD-ROM. Alternatively, the program may be installed to and used by the information processing unit from the recording medium. Still alternatively, the program may be used by gaining access to the recording medium through the network.

It will be also assumed that the computer described above includes a CPU as the processing unit for executing the program for operating the computer and processing of task AP, OS, etc, a memory for temporarily storing the data for loading the program and data during execution, a magnetic disk device for storing these programs and information, an input device for accepting an operation command and data, an output device for outputting various kinds of information, and hardware resources such as a communication device for communicating with other computers.

Figure 2:
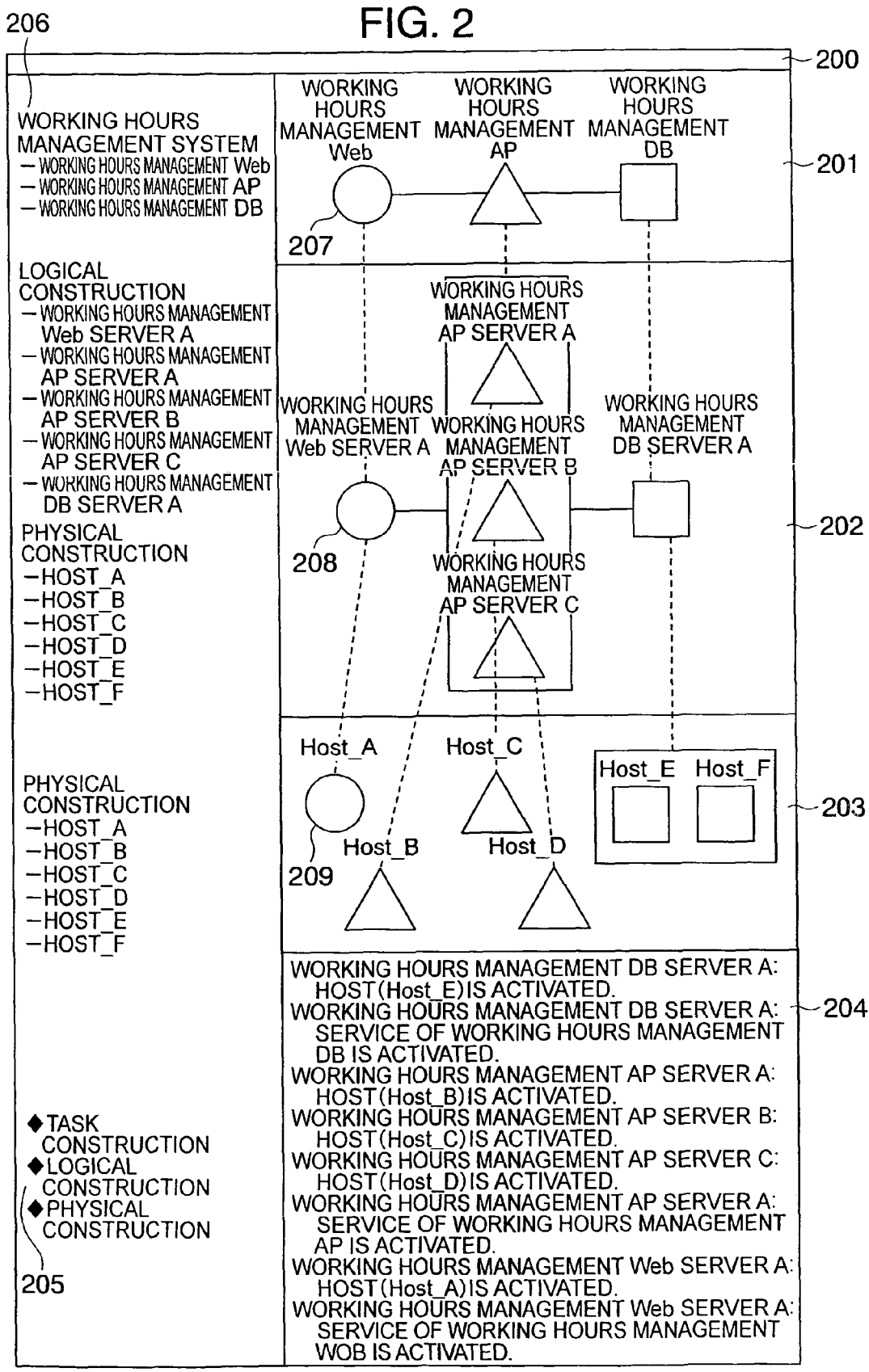
FIG. 2 shows a screen construction of a screen outputted to a client 130 according to the embodiment of the invention.

FIG. 2 is a view showing a screen construction of a screen outputted to a client 130 in this embodiment. As shown in FIG. 2, screen constituent elements of this embodiment include a task construction display area 201, a logical construction display area 202 displaying logical constituent elements in relation with one another, a physical construction display area 203 for displaying the physical construction, an event console area 204 for displaying an event message for associating constituent elements with one another, a display layer switch area 205 for switching a screen display area and a construction information list display area 206 for displaying a list of construction information.

Task construction information 207 as a constituent element of the task and a relation between construction information are displayed in the task construction display area 201. Logical construction information 208 as a constituent element of logics and a relation between construction information are displayed in the logical construction display area 202. Physical construction information 209 as a physical constituent element and a relation between construction information are displayed in the physical construction display area 203. The related information bridging between the display areas is indicated by dotted line. When a relation of a plurality of construction information exists for one construction information, the plurality of construction information is displayed in a group form. A message content of the event message and a host issuing the event are displayed in the event console area 204.

Selection items of "task construction", "logical construction" and "physical construction" exist in the display layer switch area 205. When these items are selected, display/non-display of the task construction display area 201, the logical construction display area 202 and the physical construction display area 203 can be made. A plurality of selection items can be selected from these selection items.

FIGS. 28 to 33 show screen examples. FIG. 34 shows the content of the event DB 116.

Figure 28:
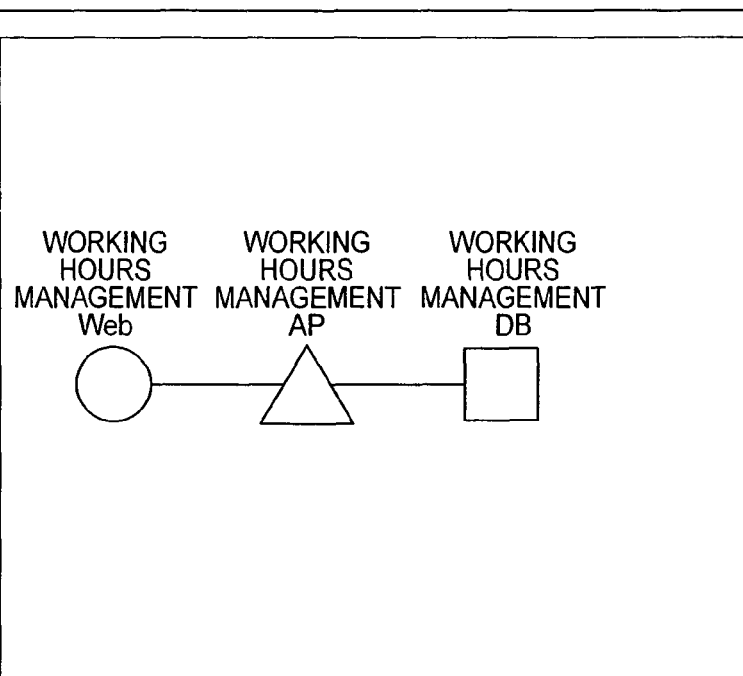
FIG. 28 shows a screen display example when a user executing monitor of "business service name-working hours management system" according to the embodiment selects "business construction" of a layer switch area.

FIG. 28 shows a screen display example when a user monitoring "task service name=inventory control system or working hours management system such as off-duty system" selects "task construction" of the layer switch area. The task construction display area is displayed on the screen and the task construction information (working hours management Web, working hours management AP, working hours management DB) as the task application of the working hours management system is displayed in the screen in the form in which the respective construction information is associated with one another. A list of the task construction information is displayed in the construction information list display area and only the message associated with the task construction information is displayed in the message console area.

Figure 29:
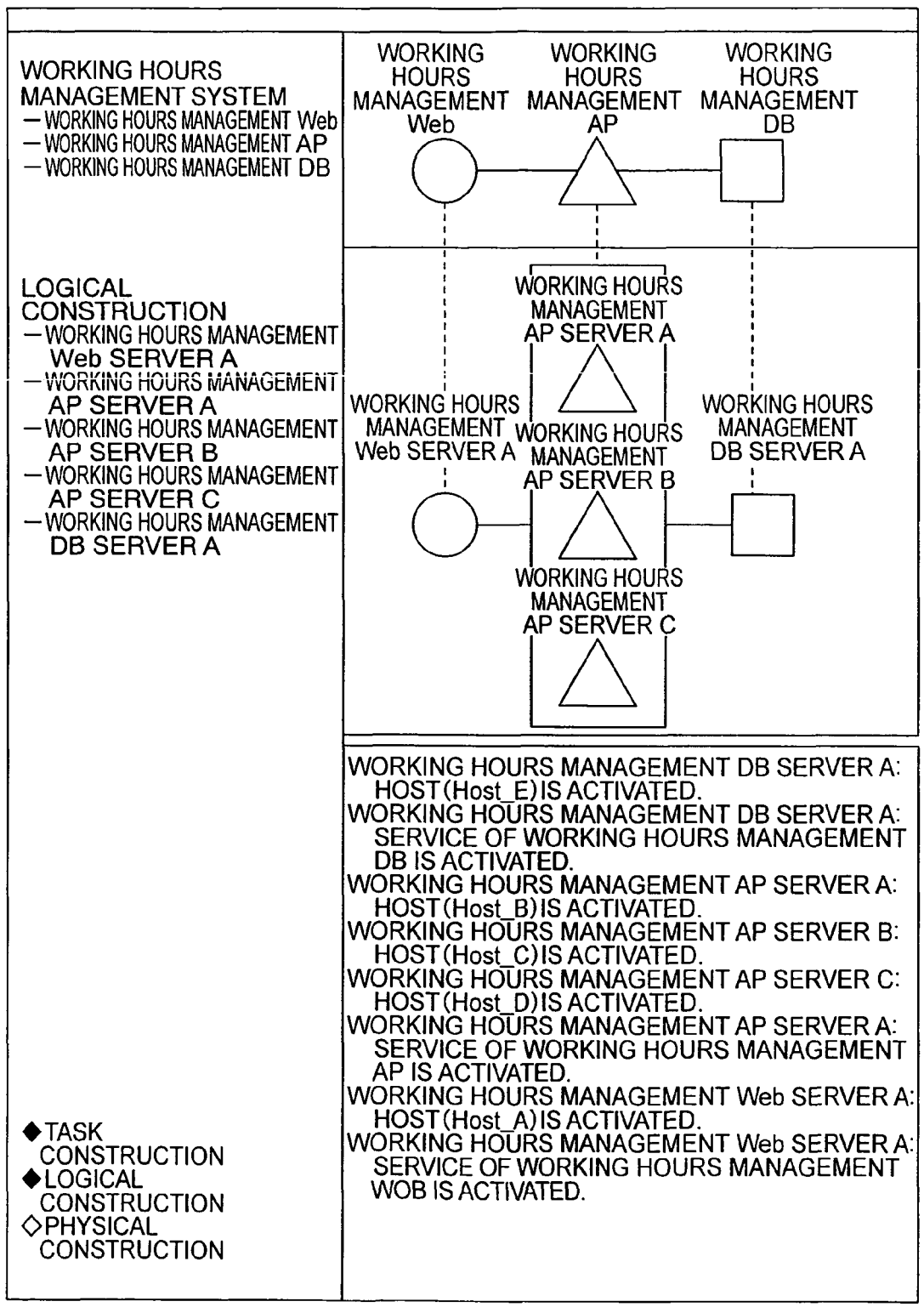
FIG. 29 shows a screen display example when the user shown in FIG. 28 selects "business construction" and "logical construction" of a display layer switch area 205.

FIG. 29 is a view showing a screen display example when the user selects "task construction" and "logical construction" of the display layer switch area 205 of the embodiment shown in FIG. 28. Logical construction information representing the logical resources of the task construction information is displayed in the logical construction display area in which the logical construction display area is displayed in addition to the task construction display area shown in FIG. 28.

In FIG. 29, the logical construction information (working hours management Web server A) that represents the logical resources is displayed for the physical construction information (working hours management Web) and a relation line is displayed, too. The logical construction information (working hours management DB server A) that represents the logical resources of the host of the execution party is displayed for the physical construction information (working hours management DB) and a relation line is displayed, too. Since load distribution is made, a plurality of logical resources (working hours management AP server A, working hours management AP server B, working hours management AP server C) is displayed for the task construction information (working hours management AP). Furthermore, the working hours management AP server A, the working hours management AP server B and the working hours management AP server C are displayed while being encompassed as a group and associated with the working hours management AP.

The list of the task construction information and the logical construction information are displayed in the construction information list display area, and the message associated with the task construction information and the logical construction information is displayed in the event console area.

The event associated with the IT resource associated in turn with the logical construction information is changed to the name set to the logical construction information and is displayed.

Figure 30:
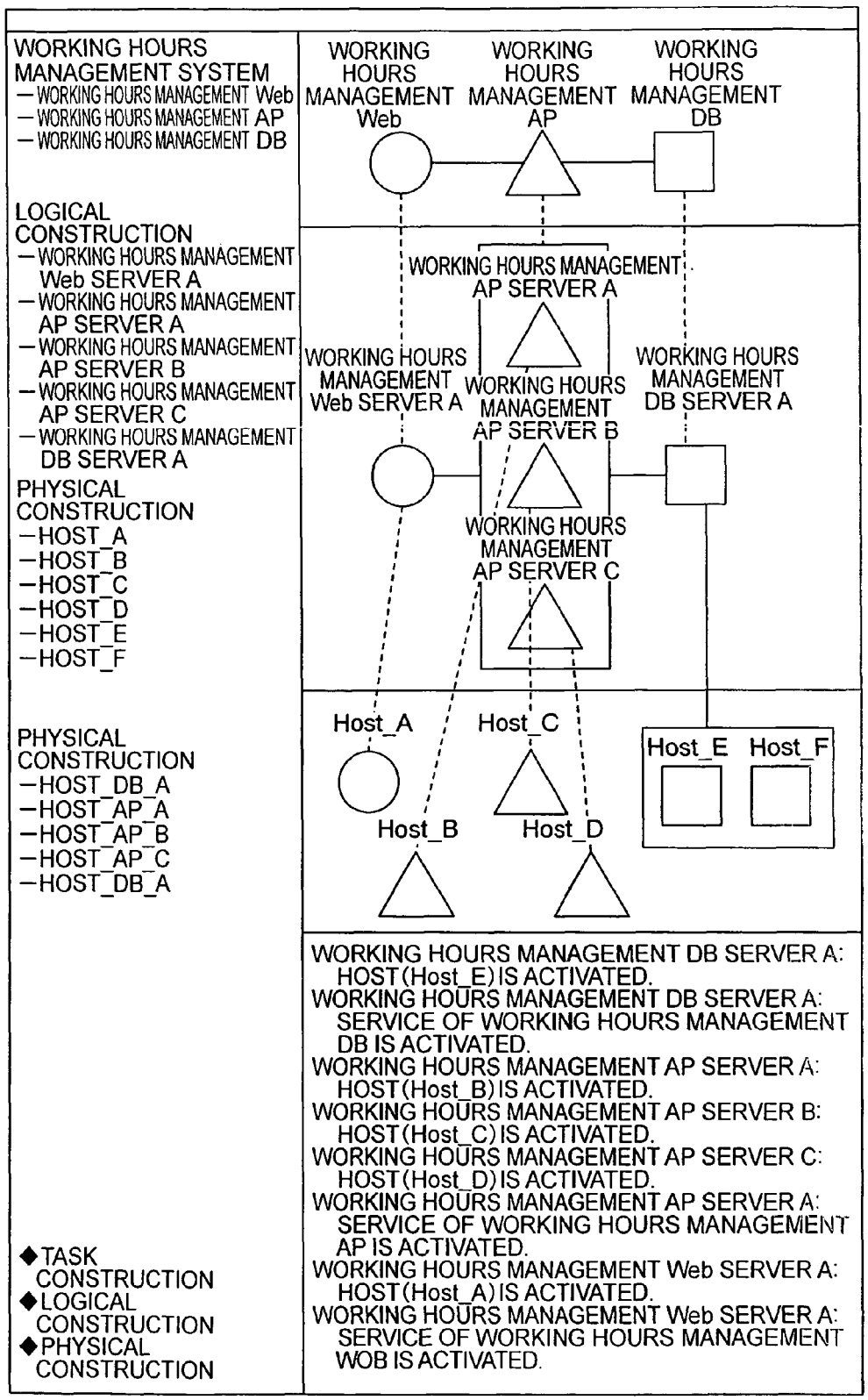
FIG. 30 shows a screen display example when the user shown in FIG. 29 selects "business construction", "logical construction" and "physical construction" of the display layer switch area 205.

FIG. 30 shows a screen display example when the user shown in FIG. 29 in the embodiment selects "task construction", "logical construction" and "physical construction" of the display layer switch area 205. FIG. 30 shows the construction information representing the physical resource of the logical construction information in addition to FIG. 29.

The physical construction information (HOST_A) representing the physical resource for the logical construction information (working hours management Web server A) is displayed in the physical construction display area and the physical construction information (HOST_B, HOST_C, HOST_D) representing the physical resources for the logical construction information (working hours management AP server A, working hours management AP server B, working hours management AP server C) is displayed. Because physical clustering is made for the logical construction information (working hours management DB server A), a plurality of physical resources (HOST_E, HOST_F) is displayed. Furthermore, HOST_E and HOST_F are displayed while being encompassed as a group and a relation with the working hours management DB server A is displayed.

A list of the task construction information, the logical construction information and the physical construction information is displayed in the construction information list display area.

In FIG. 28, the event associated with the IT resource is outputted as the event converted to the name that is set by the logical construction information, but it can be outputted as the event converted to the name set by the logical construction information or the logical name of the IT resource in accordance with setting of the message priority of the user.

FIG. 31 shows a screen display example when the construction information of the embodiment is selected. When the working hours management AP is selected, the message corresponding to (working hours management AP server A, working hours management AP server B, working hours management AP server C) associated with the working hours management AP is displayed in the event console area.

Owing to the construction described above, the user can monitor only the screen area the user desires to monitor, and the message associated with the area the user desires to monitor can be displayed on the screen.

Figure 32:
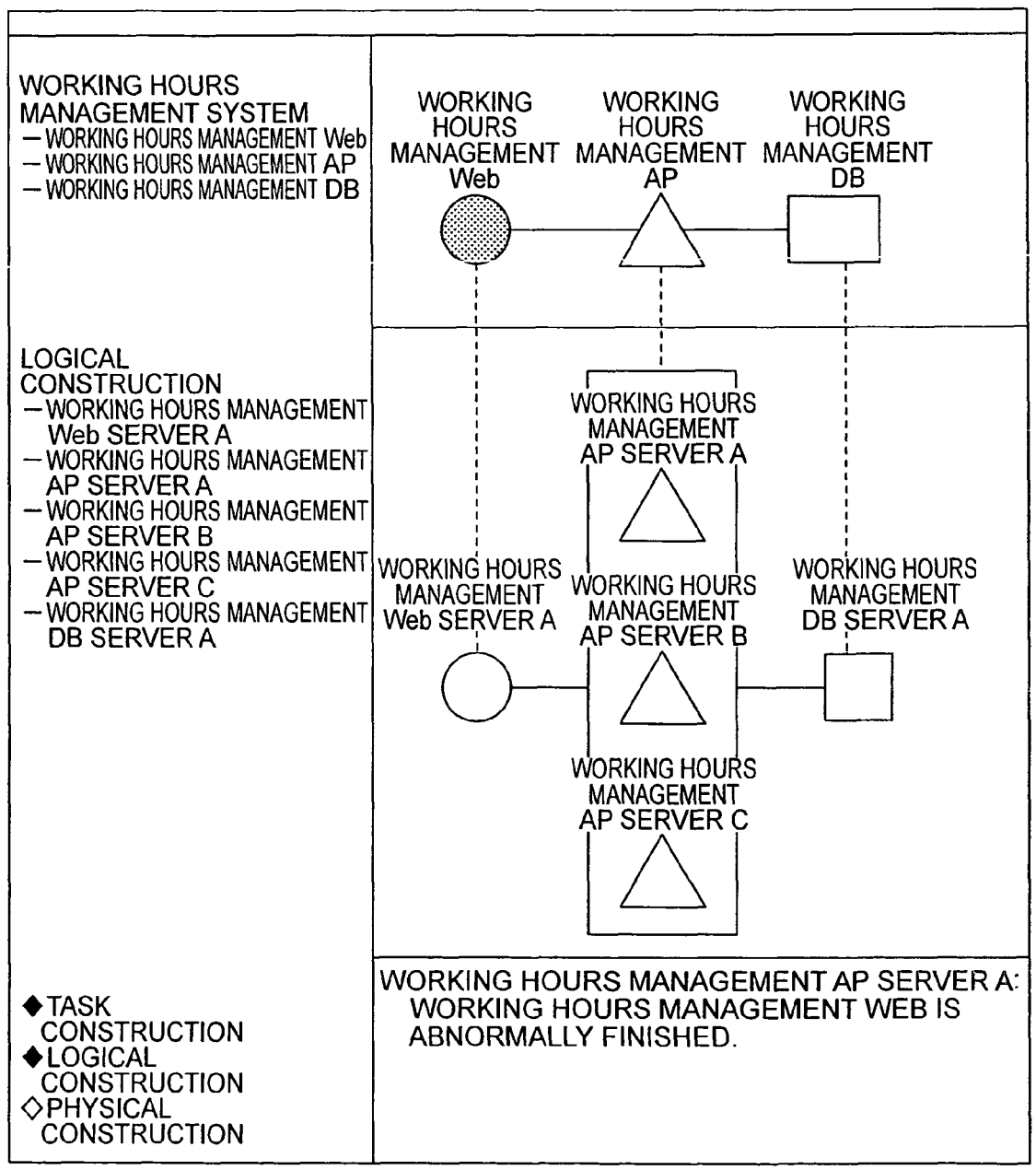
FIG. 32 shows an example when a task program itself according to the embodiment undergoes an abnormal finish.

FIG. 32 shows an example when the task program itself of this embodiment undergoes an abnormal finish. In FIG. 32, the task program (working hours management Web) itself undergoes the abnormal finish and the event of the task failure is received. Consequently, the condition of the task construction information (working hours management Web) of the task construction display area shifts and its display attribute (display color) is changed.

The abnormal finish of the task program itself can be known at a look by confirming that the condition of the physical construction information, that is, the condition of the working hours management Web server A of the logical construction information, is normal.

Figure 33:
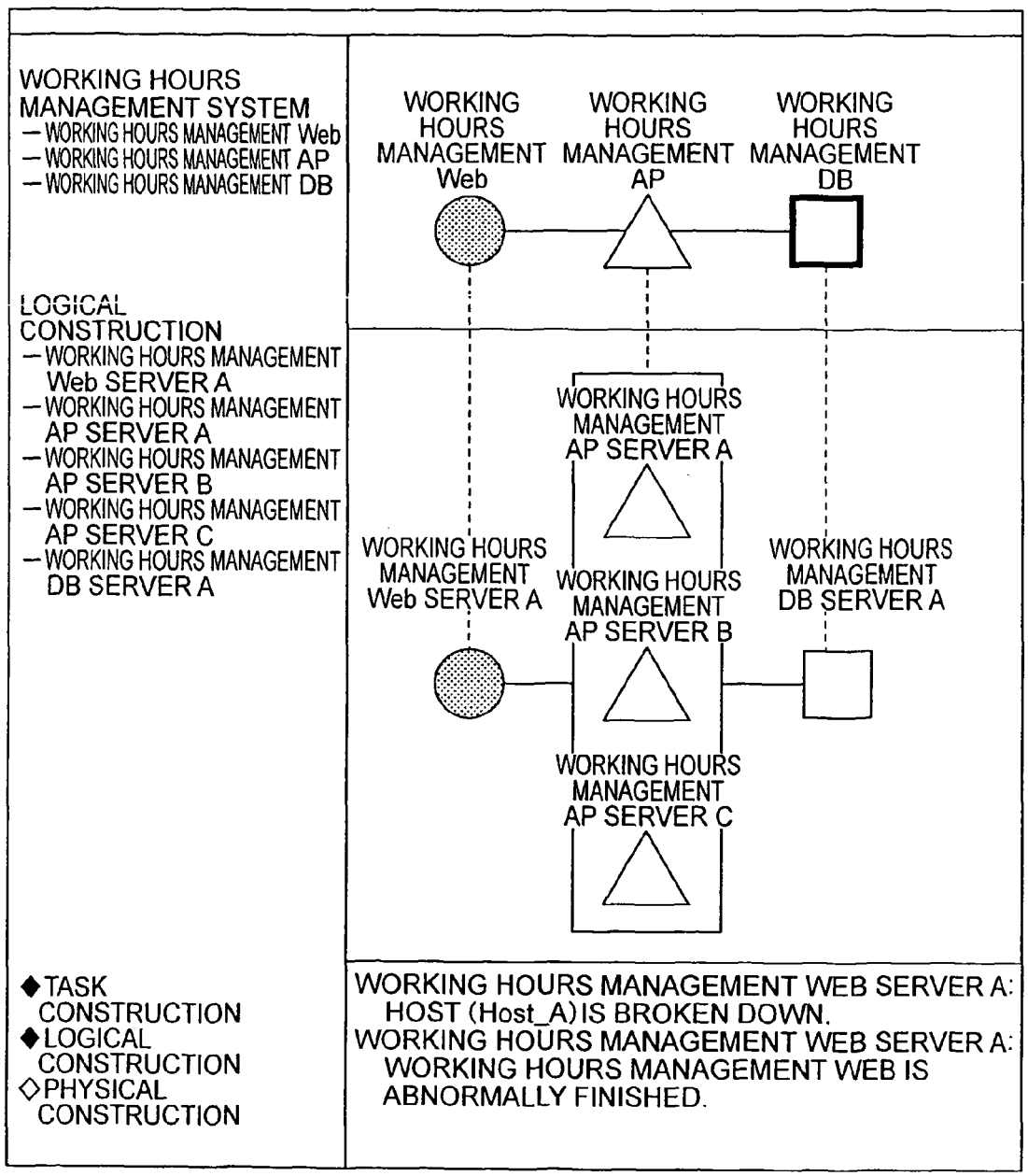
FIG. 33 shows an example when a task program undergoes an abnormal finish because a physical failure occurs in the embodiment.

FIG. 33 shows an example when the task program undergoes the abnormal finish due to a physical failure of the embodiment. As shown in FIG. 33, when the task program (working hours management Web) undergoes the abnormal finish owing to the occurrence of the physical failure (server-down at HOST_A), the condition of physical construction information (HOST_A), logical construction information (working hours management Web server A) and task construction information (working hours management Web) shifts. Because the display attribute of the working hours management Web server A corresponding to the physical construction information (HOST_A) is changed, it is possible to know at a look that the task program undergoes the abnormal finish due to the physical failure.

As described above, the information display system according to this embodiment can easily judge the case of the failure as the problem.

FIG. 34 shows a data example of the event DB 116 of this embodiment. As shown in FIG. 34, the event DB 116 of this embodiment includes an occurrence site representing the occurrence site of the event, the time of the occurrence of the event, the message generated at the time of the occurrence of the event and the event kind representing the kind of the event and stores the message displayed in the event console area when the screen is displayed.

FIGS. 3 to 7 show information for accomplishing the screen control described above.

FIG. 3 shows the detail of the user management information of this embodiment. As shown in FIG. 3, the user management information 112 stores a user name 301 representing the name of the user capable of log-in, a task construction information 302 representing whether or not authority of displaying the task construction exists, a logical construction display 303 representing whether or not authority of displaying the logical construction exists, a physical construction display 304 representing whether or not authority of displaying the physical construction exists, a construction kind 305 representing the kind of the lowermost construction that can be looked up, and an object task 306 representing the task as the object of the user.

Double circle "⊚" of the task construction display 302, the logical construction display 303 and the physical construction display 304 represents that display of the construction becomes fault at the time of log-in. White circle "○" represents that the construction is a construction layer that can be looked up by the screen operation of the user. Symbol "X" represents that it cannot be looked up by the user. The object task 306 contains the task service name and a plurality of tasks can be set.

FIG. 4 shows the detail of the screen management information 111 of this embodiment. As shown in FIG. 4, the screen management information 111 stores a screen ID 401 for identifying the screen, a task service name 402 representing the name of the task displayed on the screen, a user/group name 403 representing the name of the group to which the user making the screen request belongs, and a log-in status 404 representing whether or not log-in is made to the management computer 100.

FIG. 5 shows the detail of the task construction information 113 of this embodiment. The term "task construction information" means the information of a task application constituting the task and the information representing the relation between the condition and the application. As shown in FIG. 5, the task construction information 113 stores a task service name 501 representing the name of the task and a task construction 502 representing the element constituting the task. It also holds a task element ID 503 for identifying the task element for these task elements, a task construction element 504 representing the names of the task elements, a task element association information 505 representing the number of the task element associated with the task element and logical element relation information 506 representing the logical element associated with the task element. Here, the logical element relation information 506 has a relation with the logical information and holds the logical element name.

FIG. 6 shows the detail of the logical construction information 114 of this embodiment. The logical construction information is the information that represents the relation between a task AP name and a task AP control name operating by its logical server by using the logical server name as the logical name that virtualizes the source utilized for the task. As shown in FIG. 6, the logical construction information 114 stores a logical element ID 601 for identifying the logical element, a logical server name 60 representing the name of the logical server, a task AP control name 603 representing the control name of the task AP, a task AP name 604 representing the name of the task AP, an IP address 605 representing the address of a logical host associated with the logical element, and a logical element relation area 606 representing the number of the logical elements associated with the logical element.

FIG. 7 shows the detail of physical construction information according to the embodiment. The physical construction information is information that represents a host name of the IT resource operated by the agent and a relation between an IP address and a task AP. As shown in FIG. 7, the physical construction information 115 stores the host name 701 representing the name of the physical host, the IP address 702 representing the address of the physical host, an agent processing existence/absence flag 703 representing the existence/absence of an agent processing at the physical host, a task AP control name 704 representing the control name of the task AP, cluster information 705 representing whether or not a cluster construction is assembled at the physical host and a status 706 representing the condition of the cluster.

The processing sequence of each processing unit for accomplishing the screen control described above in the information display system of this embodiment will be explained.

Figure 8:
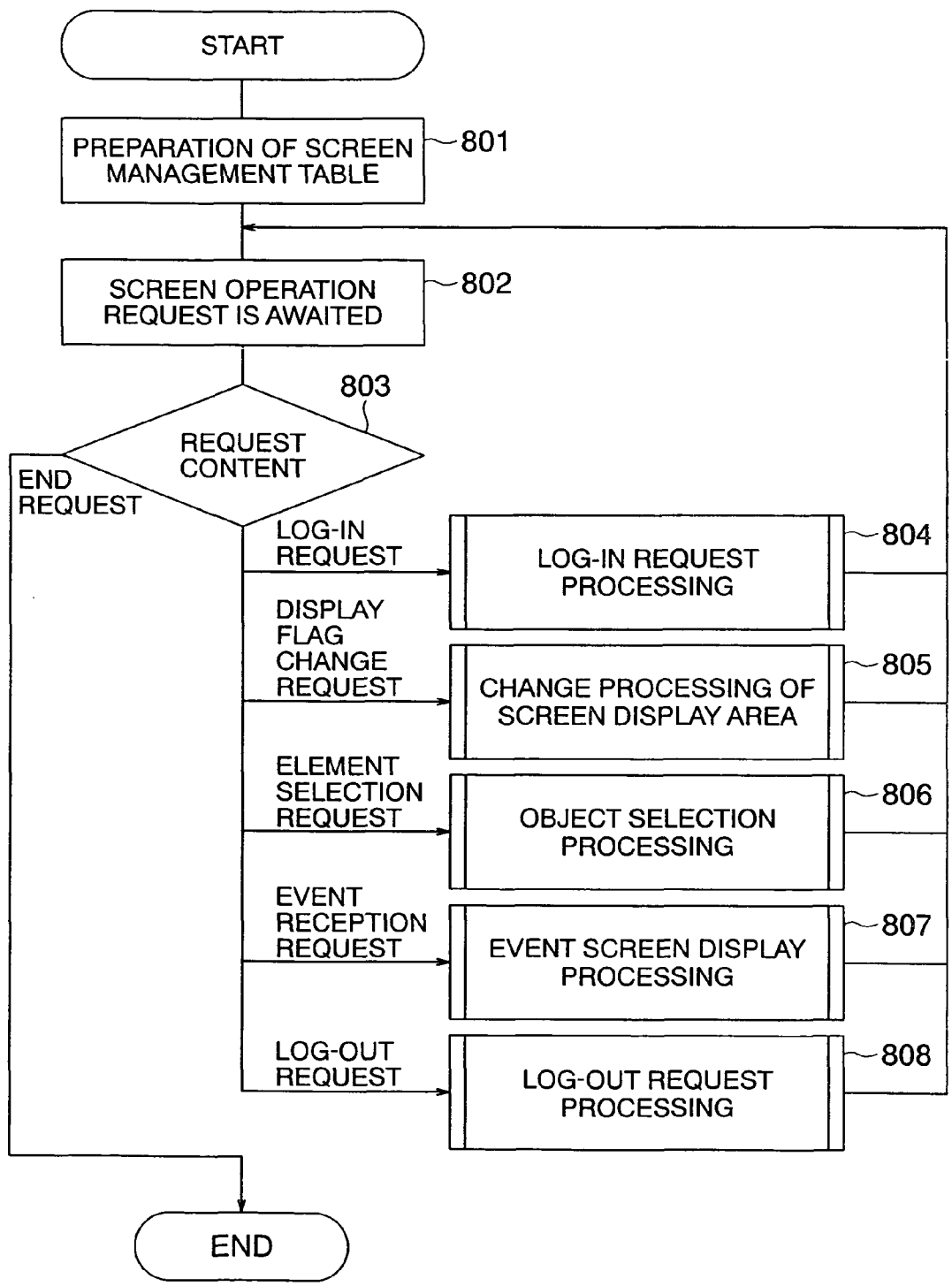
FIG. 8 shows a detail of a processing for an external request in an image control processing unit 101 according to the embodiment of the invention.

FIG. 8 is a view showing the detail of the processing for an external request in the screen control processing unit 101 in this embodiment. When operated, the screen control processing unit 101 in this embodiment generates the screen management information 111 on the memory device (801), enters the loop of waiting for the screen operation request and is under the standby state until the input from the user or a request of event reception is sent from the input device (802) as shown in FIG. 8.

When the request is applied from the input device to the screen control processing unit 101, the screen control processing unit 101 inspects the request content and then executes the processing corresponding to the request content (803).

The kinds of requests include "log-in request", "display flag change request", "element selection request", "event reception request" and "log-out request". Receiving the "log-in request", the screen control processing unit 101 executes the log-in request processing (FIG. 9) (804). Receiving the "display flag change request", it executes the change processing (FIG. 10) of the screen display area (805). Receiving the "element selection request", it executes the filtering processing (FIG. 19) of the selection construction information (806). Receiving the "event reception request", it executes the event screen display processing (FIG. 20) (807). Receiving the "log-out request, it executes the log-out request processing (808). Receiving the "finish request", it finishes the processing.

Figure 9:
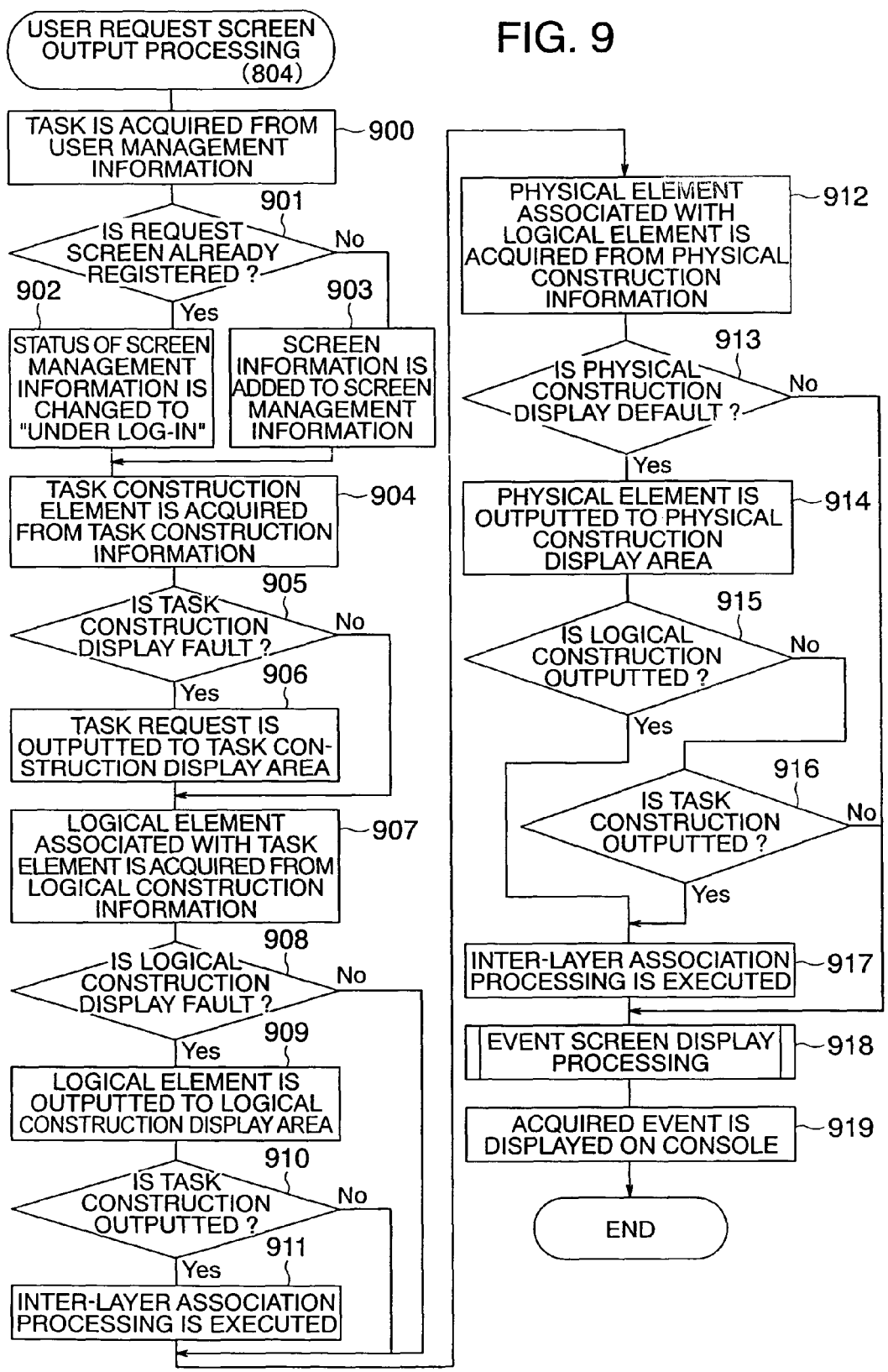
FIG. 9 shows an outline of a log-in request processing (804) in the screen control processing portion 101 according to the embodiment of the invention.

FIG. 9 is a view showing an outline of the log-in request processing (804) in the screen control processing unit 101 in this embodiment. In the log-in request processing (804) shown in FIG. 9, the user request output screen processing is executed. When the request is received in this user request output screen processing, the task service name the log-in user can look up and the information of the construction display that is under default are acquired (900) from the user management information 112 (see FIG. 3). Whether or not the screen relating to the selected user/task service name has already been generated is checked by looking up the screen management information 111 (901).

Log-in status 404 of screen management information 111 (FIG. 4) as the object is changed to "under logging" when the screen described above is generated. When the screen has not been generated, screen information is registered (903) to the screen management information 111 (FIG. 4).

Next, task construction information (task element) corresponding to the task service name acquired as described above is acquired (904) from the task construction information 113 (FIG. 5) and whether or not the task construction display is contained in the information of the default construction display determined previously is judged (905). When the task construction display is default display, the screen data for the task construction display area for displaying the task construction information acquired as described above is generated on the memory and is displayed by the output device in the task construction display area (906).

Next, logical element relation information and logical construction information 114 (FIG. 6) of the task construction information 113 are looked up by the construction management processing unit 103 to acquire the logical construction information (logical element) associated with the acquired task construction information (907). Whether or not the logical construction display is contained in the information of the default construction display previously determined (908). When the logical construction display is the default display, the screen data for the logical construction display area for displaying the logical construction information acquired is generated on the memory and is displayed in the logical construction display area (909).

Whether or not the task construction display area is displayed on the screen is checked by looking up the screen data on the memory (910). When the task construction display area is displayed, the relation line representing the relation between the task construction information under display and the logical construction information is displayed on the screen (911). At this time, when a plurality of construction information has the relation with one construction information, these kinds of construction information are displayed in the group form and the relation line is displayed on the screen.

Next, information of the IP address of the logical construction information and the physical construction information 115 (FIG. 7) are looked up by the construction management unit 103 to acquire the physical construction information associated with the logical construction information (912). Whether or not the physical construction display is contained in the information of the default construction display previously determined is judged (913). When the physical construction display proves the default display, the screen data for the physical construction display area for displaying the physical construction information is generated on the memory and displayed in the physical construction display area (914).

Whether or not the logical construction display area is displayed on the screen is checked (915) by looking up the screen data on the memory. When the logical construction display area is displayed, the relation line representing the relation between the logical construction information under display and the physical construction information is displayed on the screen (917).

When the logical construction display area is not displayed, whether or not the task construction display area is displayed is checked (916) by looking up the screen data on the memory. When the task construction display area is displayed, the relation line representing the relation between the task construction information under display and the physical construction information is displayed on the screen (917).

At this time, when a plurality of construction information has the relation with one construction information, these kinds of construction information are displayed in the group form and the relation line is displayed on the screen.

Next, the event screen display processing (FIG. 10) is executed (918), the display attribute of the construction information that is screen outputted is changed, whenever necessary, and the message of the event corresponding to the construction information is displayed in the event console area (919).

Figure 10:
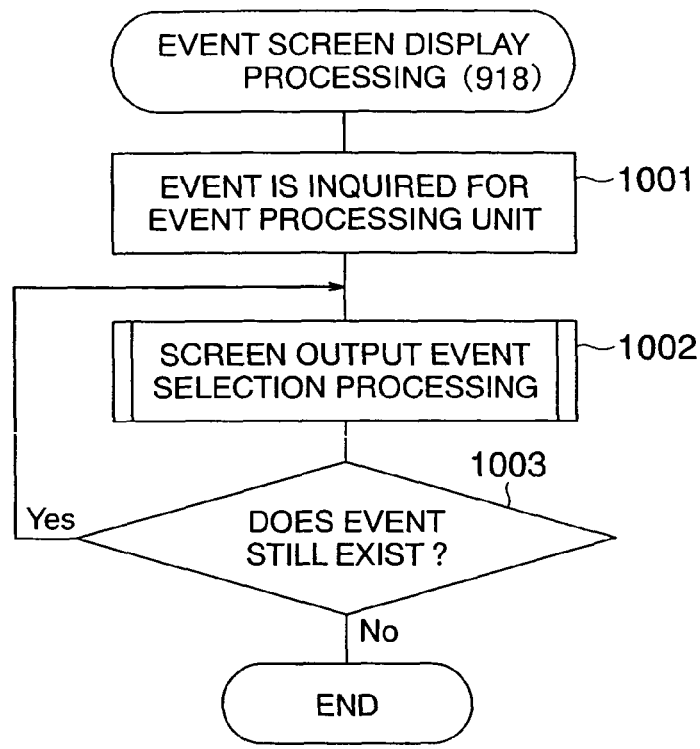
FIG. 10 shows an outline of an event screen display processing according to the embodiment of the invention.

FIG. 10 shows an outline of the event screen display processing according to this embodiment. Receiving the request of the screen control processing unit 101, the event processing unit 104 acquires the event information stored in the event DB 116 (1001).

When the event information is acquired, the message of the selected event is displayed in the event console area (1002) by the screen output event selection processing (FIG. 11) that judges whether or not the message of the event is to be outputted to the event console area. When the event information not yet processed exists, the processing of step 1002 is again executed until all the event information of the event DB 116 are processed (1003). The processing is finished when all the invent information of the event DB 116 are processed.

Figure 11:
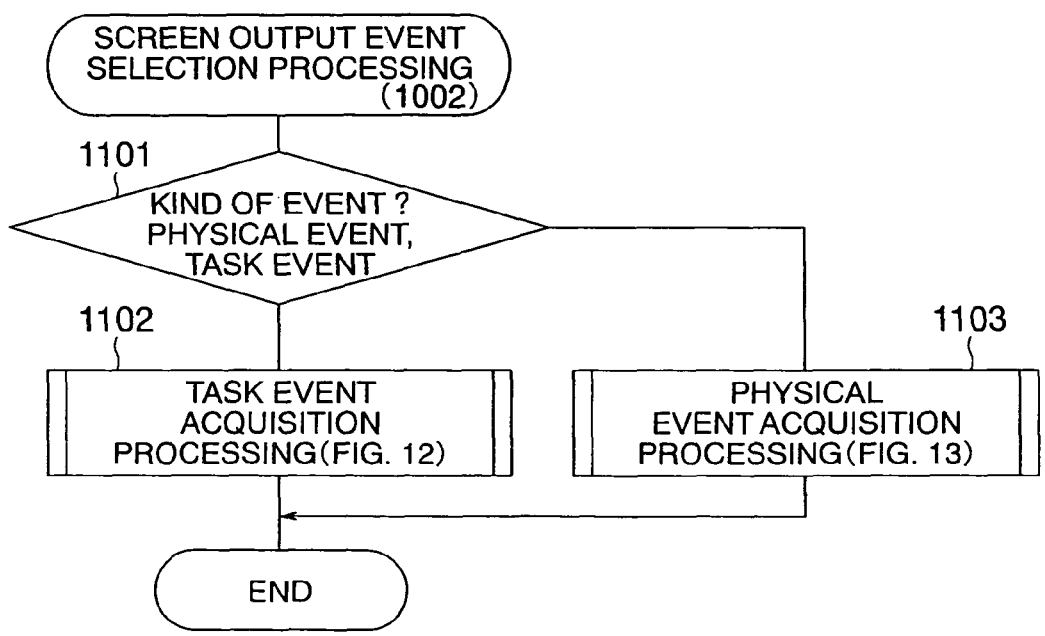
FIG. 11 shows an outline of a screen output event selection processing according to the embodiment of the invention.

FIG. 11 shows an outline of the screen output event selection processing according to this embodiment. When the request of the event selection is received, the event kind of the event information acquired is looked up and whether the kind of the event is the task event or the physical event is judged (1101). Here, the term "task event" means the event information relating to the task application or the service and represents the information such as the activation of the application, normal/abnormal finish of the processing, and so forth. The term "physical event" means the activation/stop of the actual IT resource (server, storage, etc) and the event information relating to the performance information such as CPU, memory, HDD, and so forth.

Figure 12:
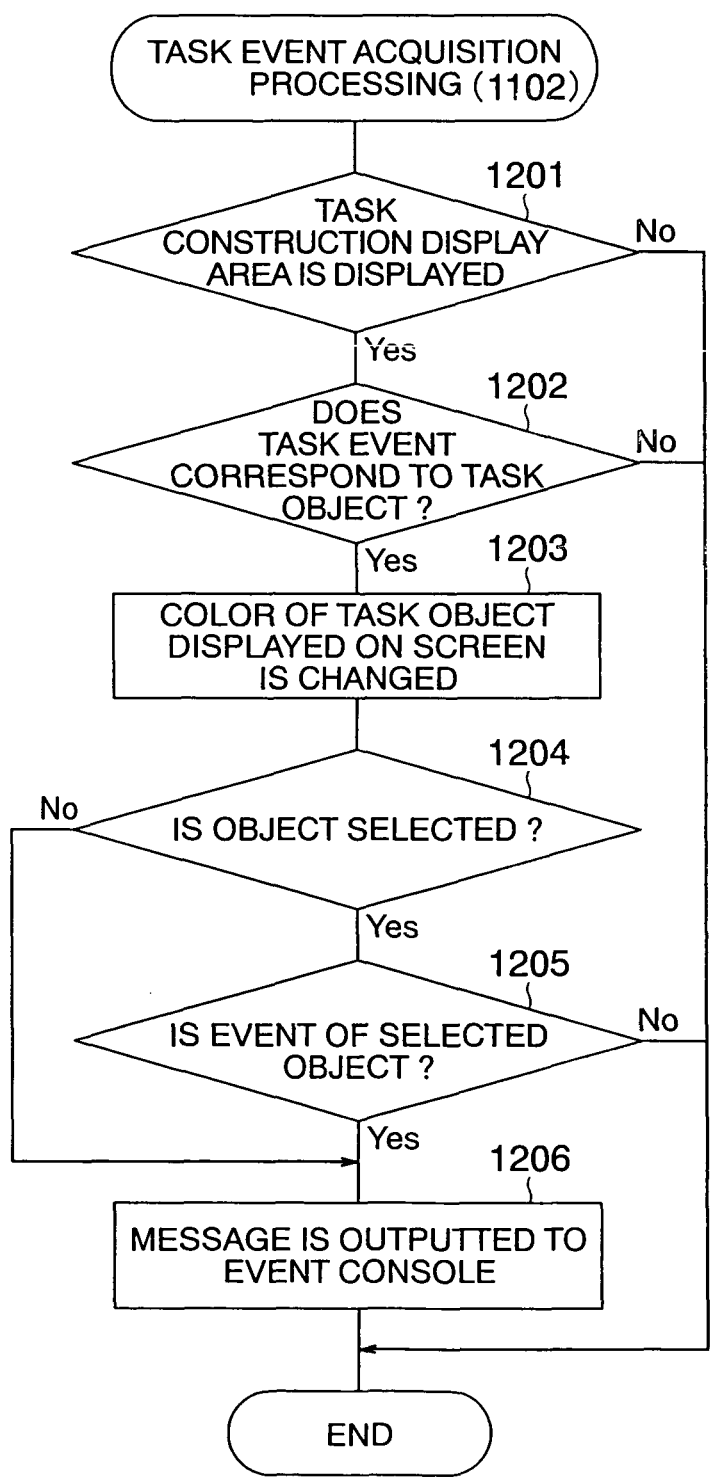
FIG. 12 shows an outline of a task event acquisition processing according to the embodiment of the invention.

When the event information acquired represents the information of the task event, state transition/output message display of the construction information displayed on the screen is executed (1102) by the task event acquisition processing (FIG. 12). When the event information acquired represents the information of the physical event, the state transition/output message display of the construction information displayed on the screen is executed (1103) by the physical event acquisition processing (FIG. 12).

FIG. 12 shows an outline of the task event acquisition processing according to this embodiment. In the task event acquisition processing, whether or not the task construction display area of the corresponding screen is displayed is judged (1201) by looking up the screen data on the memory. When it is not displayed, the processing is finished. When it is displayed, the name of the task construction information in the message of the event information is compared with the name of the task construction information in display, and whether or not the task event is the event corresponding to the task construction information displayed in the task construction display area is judged (1202). When it is not the corresponding task event, the processing is finished. When it is the corresponding event, the state of the task construction information displayed on the screen, that is, the display attribute such as the display color, is changed (1203).

Next, whether or not the construction information is selected on the screen is judged (1204). When it is not selected, the processing of step 106 is executed. When it is selected, the name of the task construction information in the message of the event information is compared with the name of the task construction information in display, and whether or not the task event is the event relating to the selected construction information is judged. When the task event does not correspond, the processing is finished. When it does, the message of the task event is displayed in the event console area and the processing is finished (1206).

Figure 13:
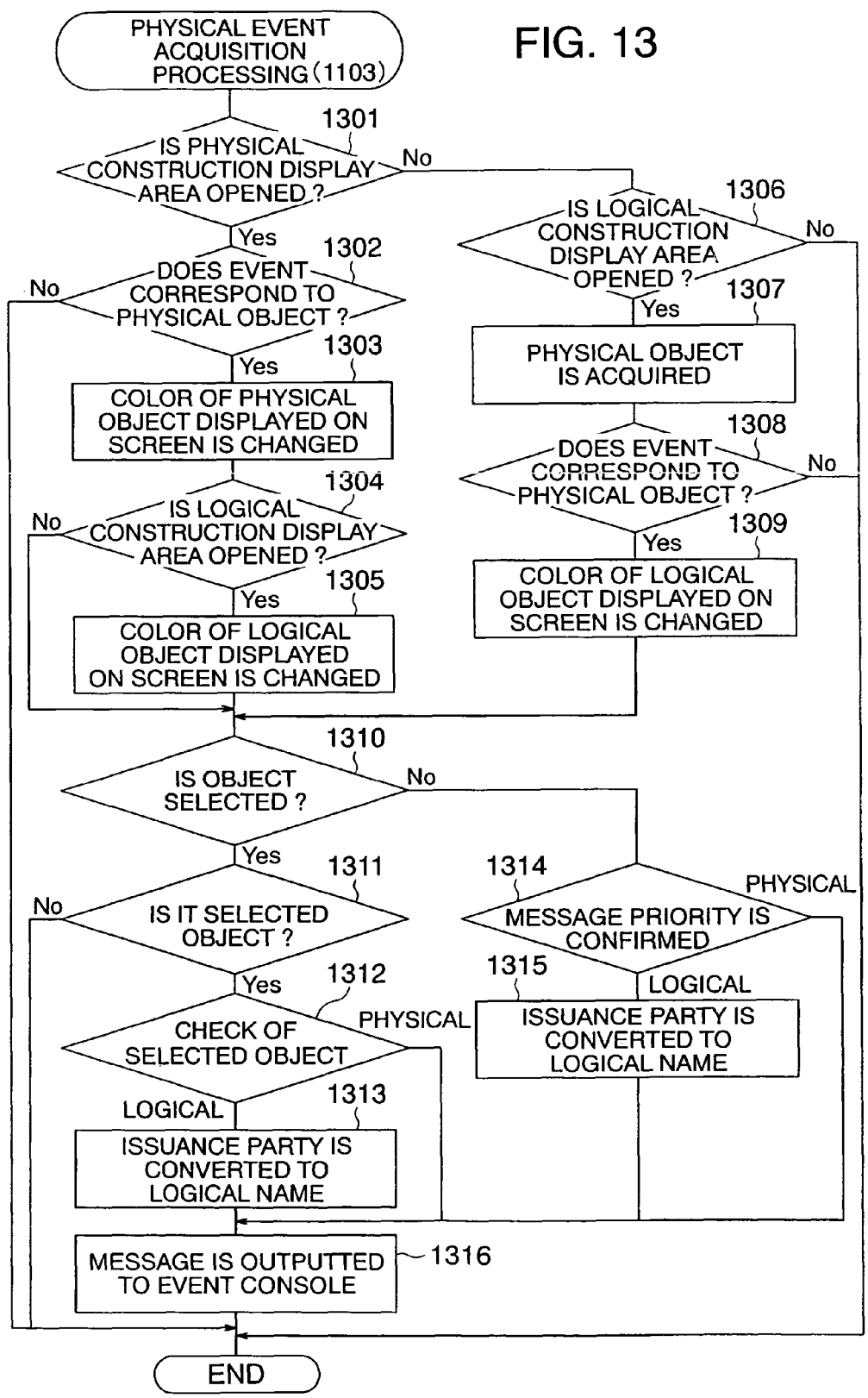
FIG. 13 shows an outline of a physical event acquisition processing according to the embodiment of the invention.

FIG. 13 shows an outline of the physical event acquisition processing according to this embodiment. In the physical event acquisition processing, the screen data on the memory is looked up and whether or not the physical construction display area of the corresponding screen is displayed is judged (1301).

When the physical construction display area is displayed (Yes in 1301), the name of the physical construction information in the message of the event information is compared with the name of the physical construction information in display, and whether or not the physical event is the event relating to the physical construction information displayed in the physical construction display area is judged (1302). When physical event does not correspond, the processing is finished. When it does, the state of the physical construction information displayed on the screen, that is, the display attribute such as the display color, is changed (1303). Next, whether or not the logical construction display area is displayed is judged (1304). When it is not displayed, the processing of step 1310 is executed. When it is displayed, the state of the logical construction information related with the physical construction information is changed (1305).

On the other hand, when the physical construction display area is not displayed ("No" in 1301), the processing is finished. When it is displayed, the information of the physical construction information related with the logical construction information under display is acquired from the logical construction information 114 by the construction management processing unit 103 (1307), and whether or not the physical event is the one that corresponds to the physical construction information acquired is judged (1308). When it does not correspond, the processing is finished. When the event corresponds, the state of the logical construction information related with the physical construction information is changed (1309).

Next, whether or not the construction information is selected on the screen is judged (1310). When the construction information is selected, whether or not the physical event is the event of the selected construction information is judged (1311). The processing is finished when the physical event is not the event of the selected construction information. When physical event is the event of the selected construction information (1311), whether the selected construction information is the logical construction information or the physical construction information is checked (1312). The processing of step 1316 is executed when the selected construction information is the physical construction information. When it is the logical construction information, the event generation party is changed to the name of the logical construction information (1315) and the processing of step 1316 is executed.

When the construction information is not selected, the message about which of the physical and logical events is to be outputted is judged in accordance with the display message priority of the user (1313). When it is the physical priority, the event generation party is changed to the logical name (1315), the processing of step 1316 is executed and the event information is outputted to the event console area (1316). It will be hereby assumed that the display message priority is in advance stored in the memory or the magnetic disk.

The processing described above makes it possible to select whether or not the event information is to be outputted to the event console area.

Figure 14:
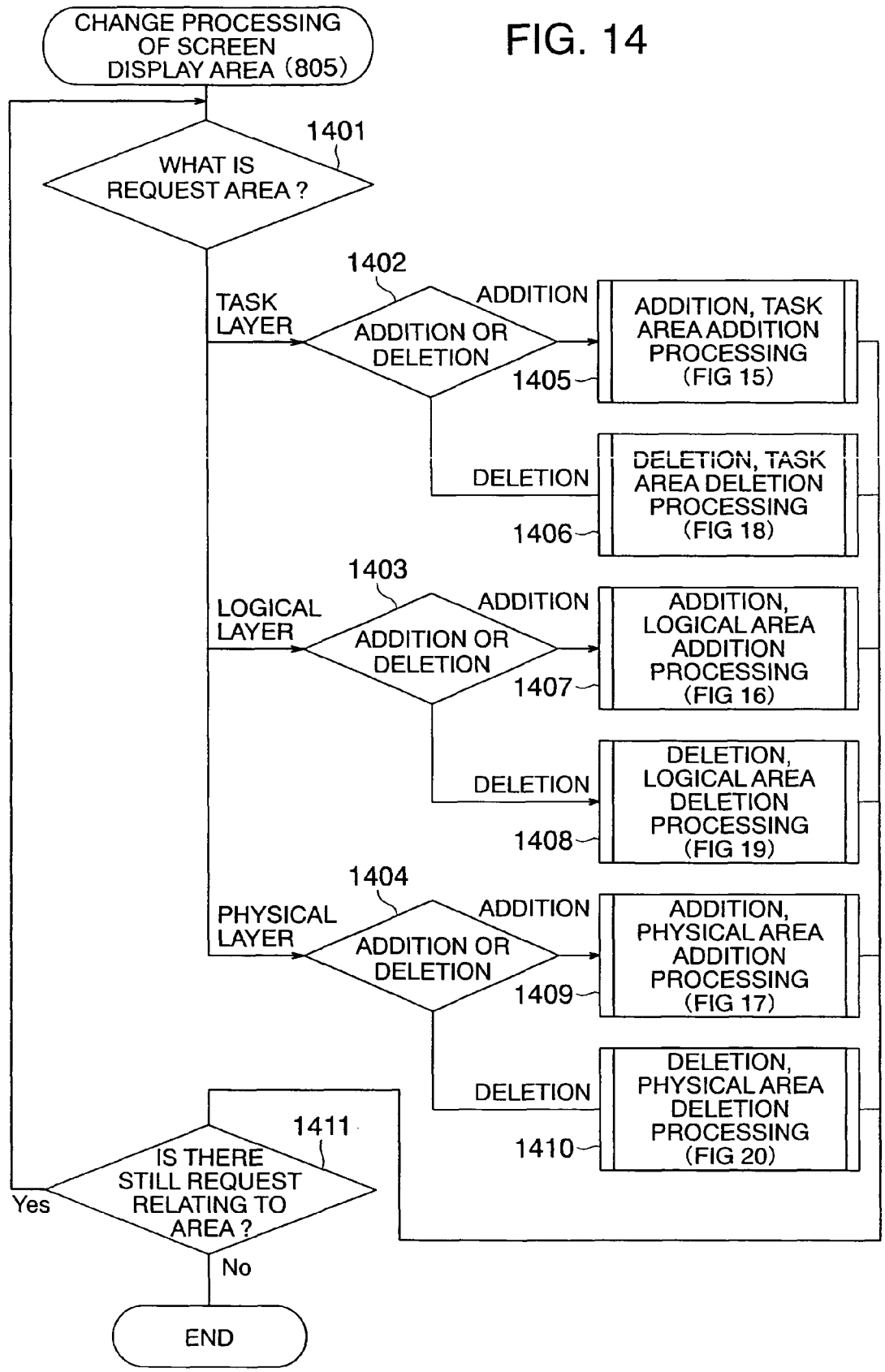
FIG. 14 shows a detail of a change processing of a screen display area according to the embodiment of the invention.

FIG. 14 shows the detail of the change processing of the screen display area according to the embodiment. When the change request of the display area is received, the content of the change request is examined and which construction display area is requested is judged (1401). When the change request is a request relating to the task construction display area, whether the change request is the addition request of the area or its deletion request is judged (1402). When the request is the addition request, a task construction display area addition processing is executed and the task construction display area and the corresponding message are displayed on the screen (1405). When the change request is the deletion request, the task construction display area deletion processing is executed and the task construction display area and the corresponding message are deleted from the screen (1406).

When the change request is a request relating to the physical area, whether the change request is the addition request of the area or its deletion request is judged (1404). When the request is the addition request, a physical construction display area addition processing is executed and the physical construction display area and the corresponding message are displayed on the screen (1409). When the change request is the deletion request, a physical construction display area deletion processing is executed and the physical construction display area and the corresponding message are deleted from the screen (1410).

Next, whether or not other requests for the area change exist is judged (1411). When other requests of the area change exist, the processing from step 1401 is again executed. When other requests for the area change do not exist, the processing is finished.

Figure 15:
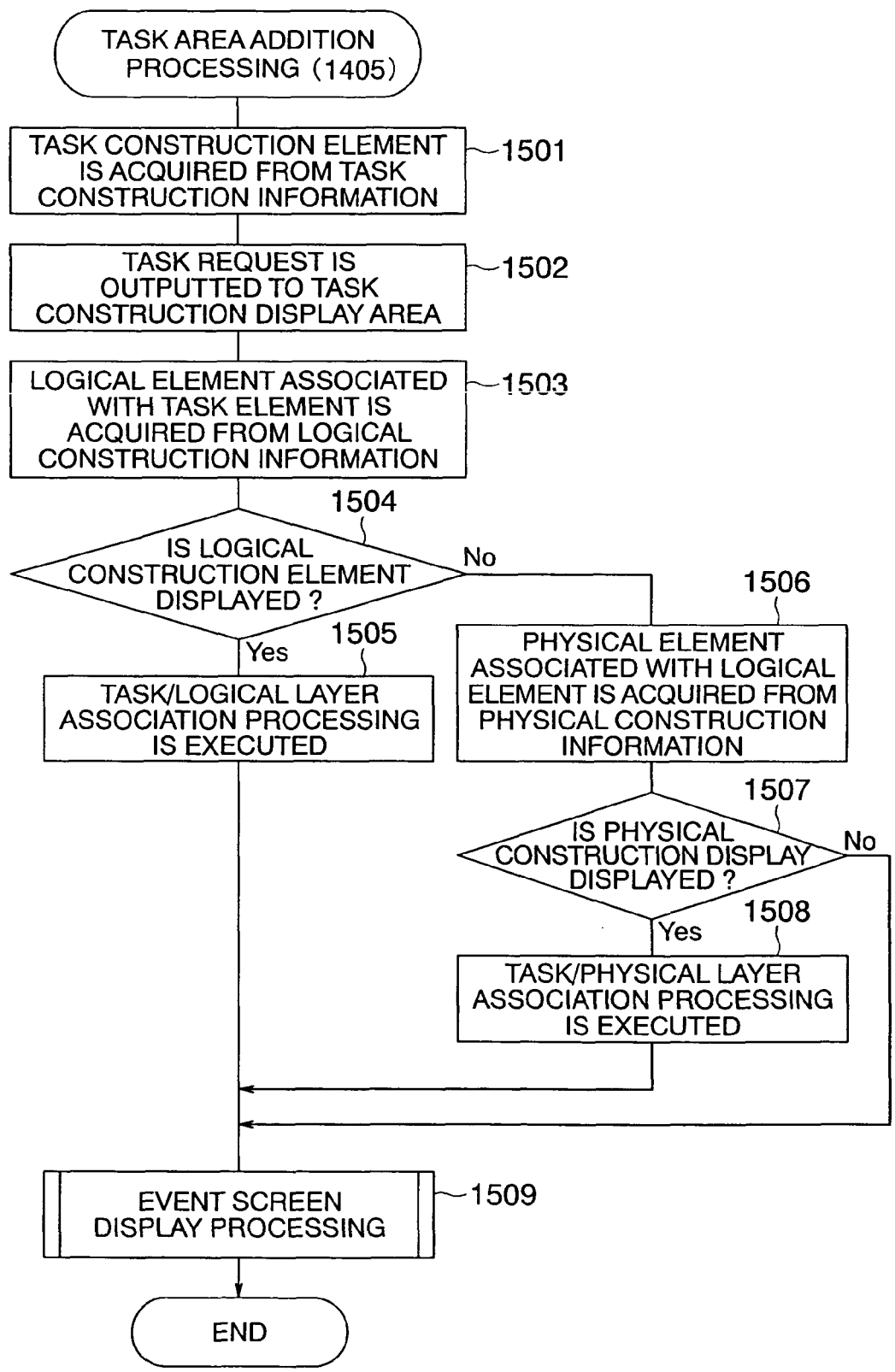
FIG. 15 shows the flow of a task construction display area addition processing according to the embodiment of the invention.

FIG. 15 shows the flow of the task construction display area addition processing according to the embodiment. When the addition request of the construction display area is received, the construction management processing unit 103 looks up the task construction information 113, acquires the task construction information (1501) from the task service name, generates the task construction display area, outputs the task construction information (1502) and checks whether or not the logical construction display area is displayed (1504).

When the logical construction display area is displayed, the relation line between the task construction information and the logical construction information is outputted (1505) and the processing of step 1509 is executed. When the logical construction display area is not displayed, the physical construction information related with the logical construction information is acquired from the physical construction information 115 by the construction management unit 103 (1506) and whether or not the physical construction display area is displayed is checked (1507). When the physical construction display area is displayed, the relation line between the business construction information and the physical construction line is outputted (1509) and the processing of step 1509 is executed.

Next, the event screen display processing is executed for the construction information outputted (1509) and the event information is outputted to the event console area.

Figure 16:
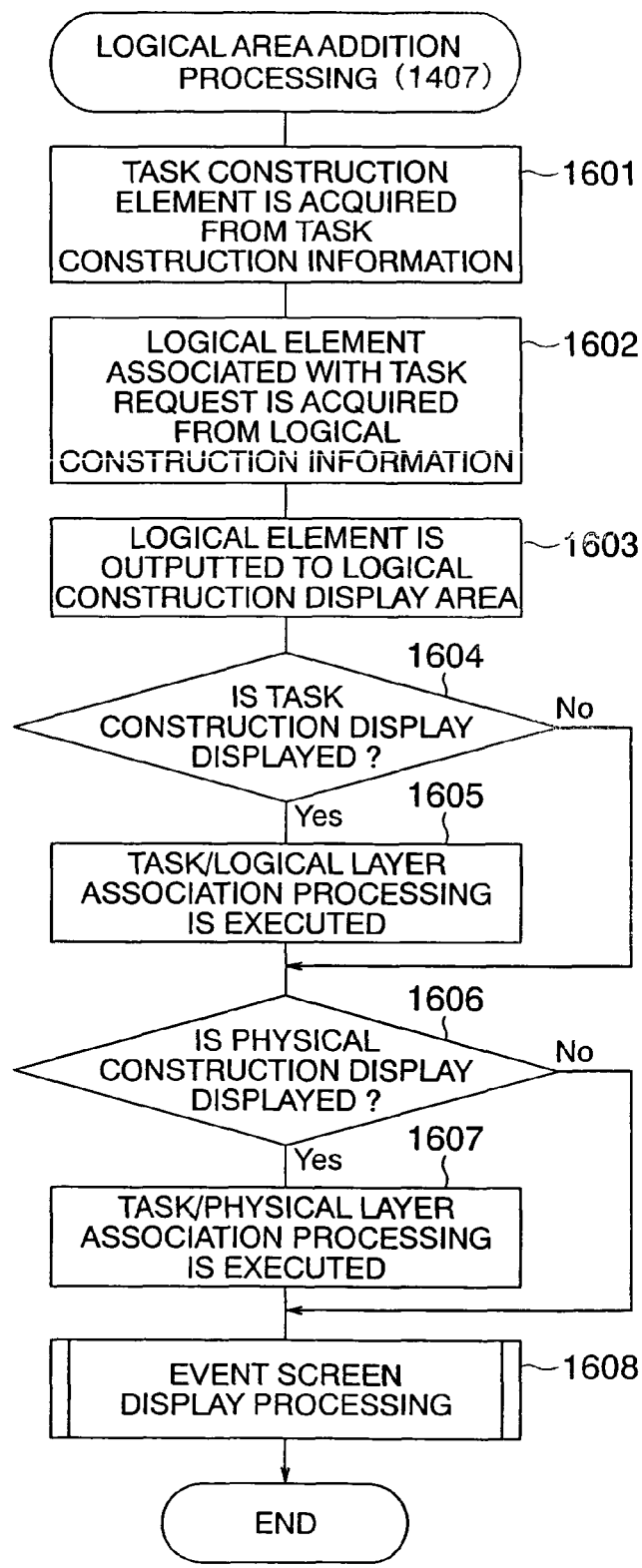
FIG. 16 shows the flow of a logical construction display area addition processing according to the embodiment of the invention.

FIG. 16 shows the flow of the logical construction display area addition processing according to the embodiment. When the addition request of the logical construction display area is received, the construction management processing unit 103 looks up the task construction information 113 and acquires the task construction information (1601) from the task service name and the construction management processing unit 103 looks up the logical construction information 114, acquires the logical construction information related with its task construction information (1602), generates the logical construction display area, outputs the task construction information (1603) and checks whether or not the task construction display area is displayed (1604).

The processing of step 1606 is executed when the task construction display area is not displayed. When the task construction display area is displayed, the relation line between the task construction information and the logical construction information is outputted (1605) and the processing of step 1606 is executed.

In step 1606, whether or not the physical construction display area is displayed is checked. When the physical construction display area is not displayed, the processing of step 1608 is executed. When the physical construction display area is displayed, the relation line between the logical construction information and the physical construction line is outputted (1607) and the processing of step 1608 is executed.

In step 1608, the event screen display processing (FIG. 10) is executed for the construction information outputted in step 1608 and the event information is outputted to the event console.

Figure 17:
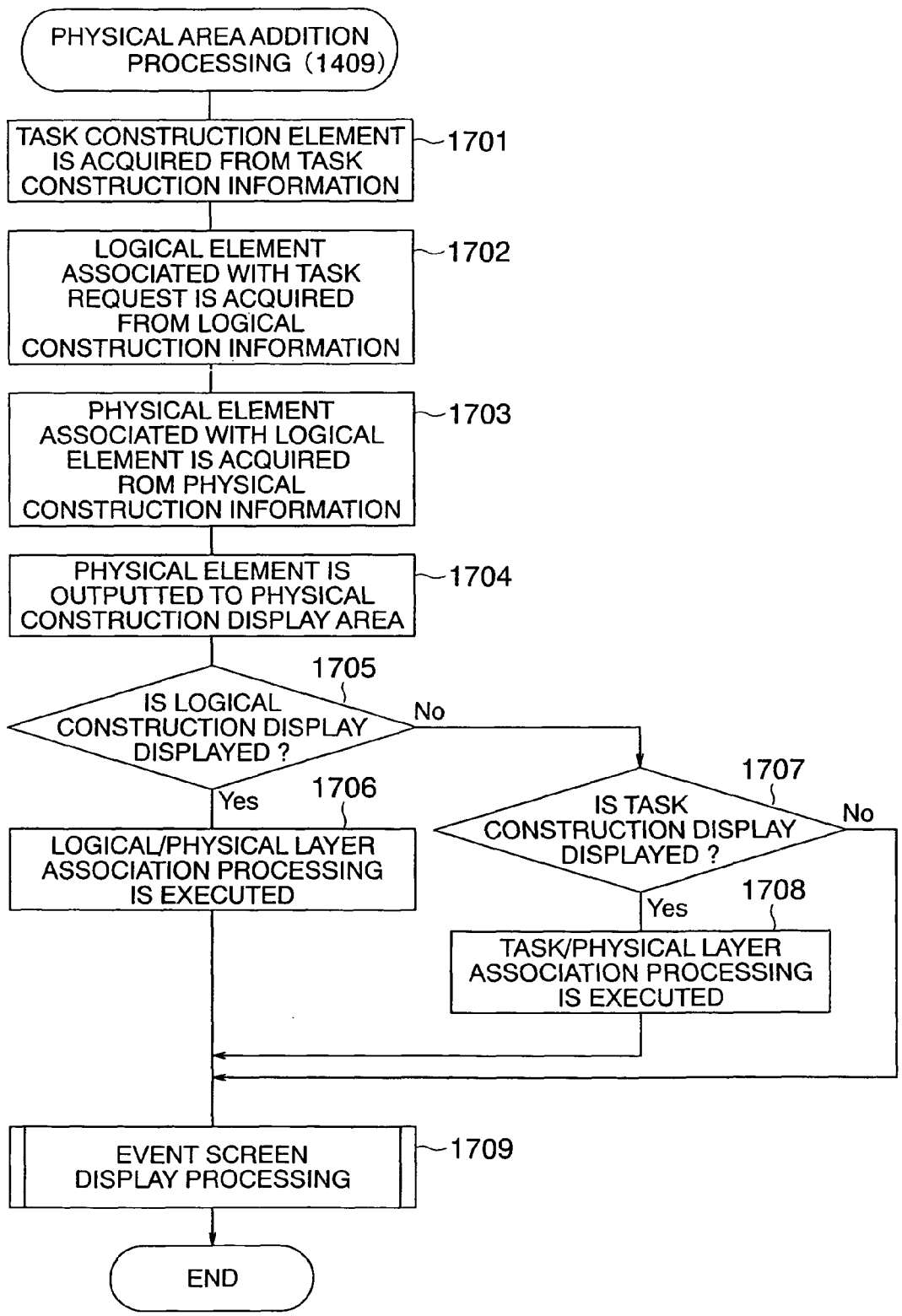
FIG. 17 shows the flow of a physical construction display area addition processing according to an embodiment of the invention.

FIG. 17 shows the flow of the physical construction display area addition processing according to the embodiment. When the addition request of the physical construction display area is received, the construction management processing unit 103 looks up the task construction information 113 and acquires the task construction information (1701) from the task service name. The construction management processing unit 103 then looks up the logical construction information 114, acquires the logical construction information associated with its task construction information (1702). Furthermore, the construction management processing unit 103 acquires the physical construction information from the physical construction information 115 (1703), generates the physical construction display area, outputs the physical construction information (1704) and checks whether or not the logical construction display area is displayed (1705).

When the logical construction display area is displayed, the relation line between the logical construction information and the physical construction information is outputted (1706) and the processing of step 1709 is executed.

When the logical construction display area is not displayed, whether or not the task construction display area is displayed is checked (1707). When the task construction display area is displayed, the relation line between the task construction information and the physical construction information is outputted (1708) and the processing of step 1709 is executed.

In step 1709, the event screen display processing (FIG. 10) is executed for the construction information outputted in step 1709 and the event information is outputted to the event console.

Figure 18:
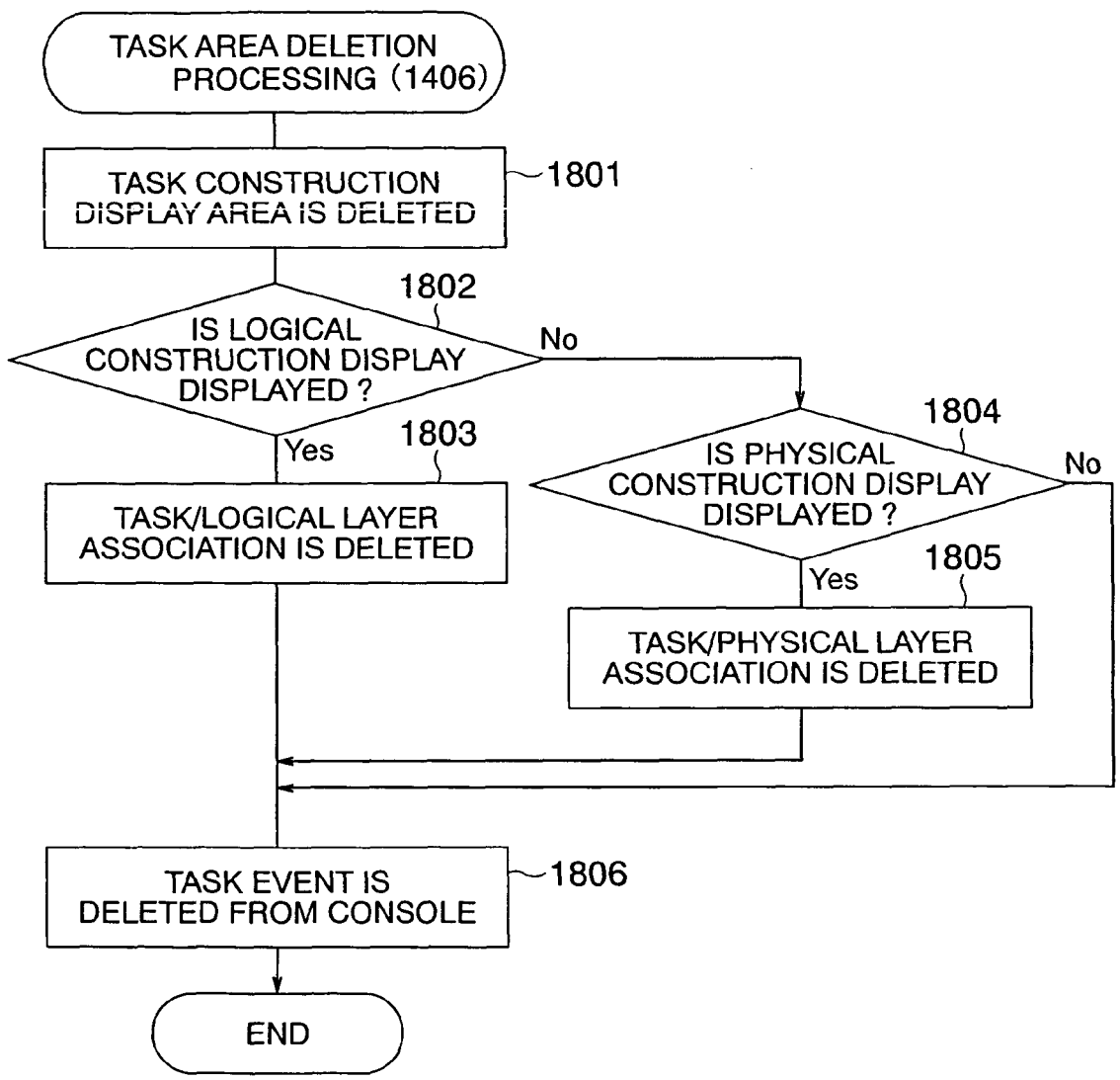
FIG. 18 shows the flow of a task construction display area deletion processing according to the embodiment of the invention.

FIG. 18 shows the flow of the task construction display area deletion processing according to the embodiment. The task construction display area is deleted from the screen (1801) when the deletion request of the task construction display area is received, and whether or not the physical construction display area is displayed is checked (1802).

The deletion line between the task construction information and the logical construction information is deleted when the logical construction display area is displayed (1803). When the logical construction display area is not displayed, whether or not the physical construction display area is displayed is checked (1804). When the physical construction display area is displayed, the relation line between the task construction information and the physical construction information is deleted (1805). Next, the event corresponding to the task construction information is deleted from the event console area (1806) and the processing is finished.

Figure 19:
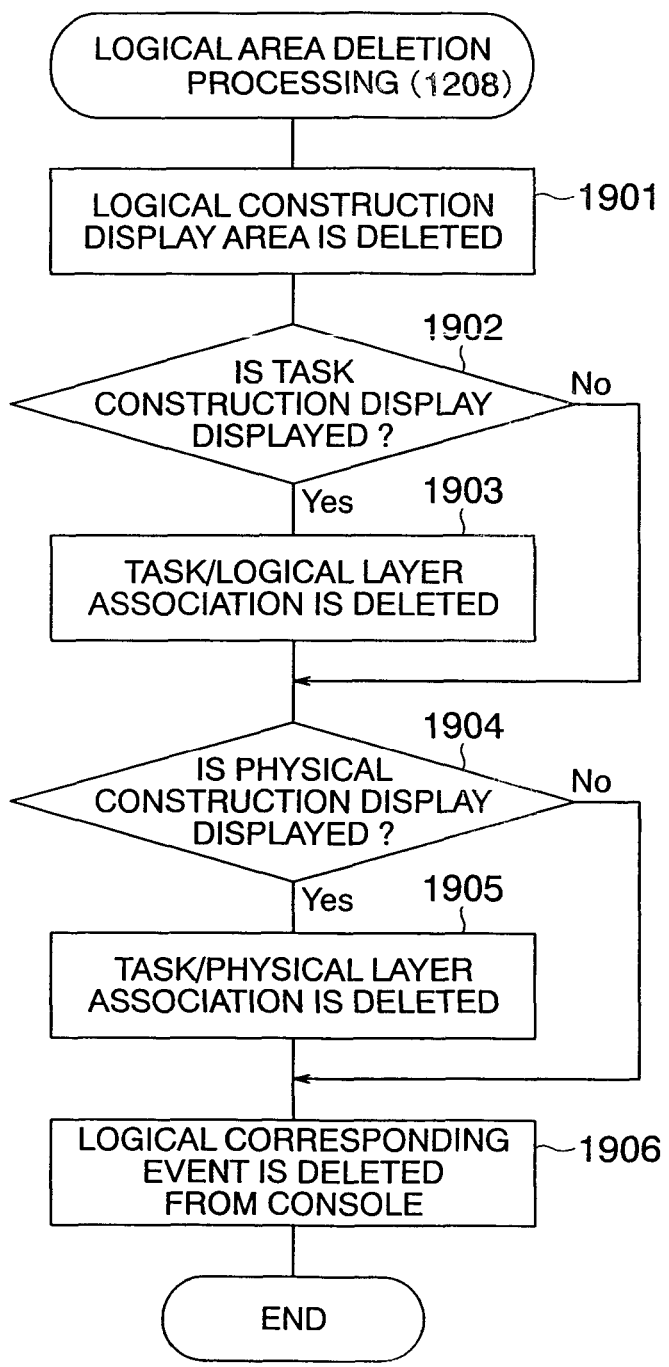
FIG. 19 shows the flow of a logical construction display area deletion processing according to the embodiment of the invention.

FIG. 19 shows the flow of the logical construction display area deletion processing according to the embodiment. The logical construction display area is deleted from the screen (1901) when the deletion request of the logical construction display area is received, and whether or not the task construction display area is displayed is checked (1902).

The deletion line between the task construction information and the logical construction information is deleted when the task construction display area is displayed (1903), and whether or not the physical construction display area is displayed is checked (1904). When the physical construction display area is displayed, the relation line between the logical construction information and the physical construction information is deleted (1905). Next, the event corresponding to the logical construction information is deleted from the event console area (1906) and the processing is finished.

Figure 20:
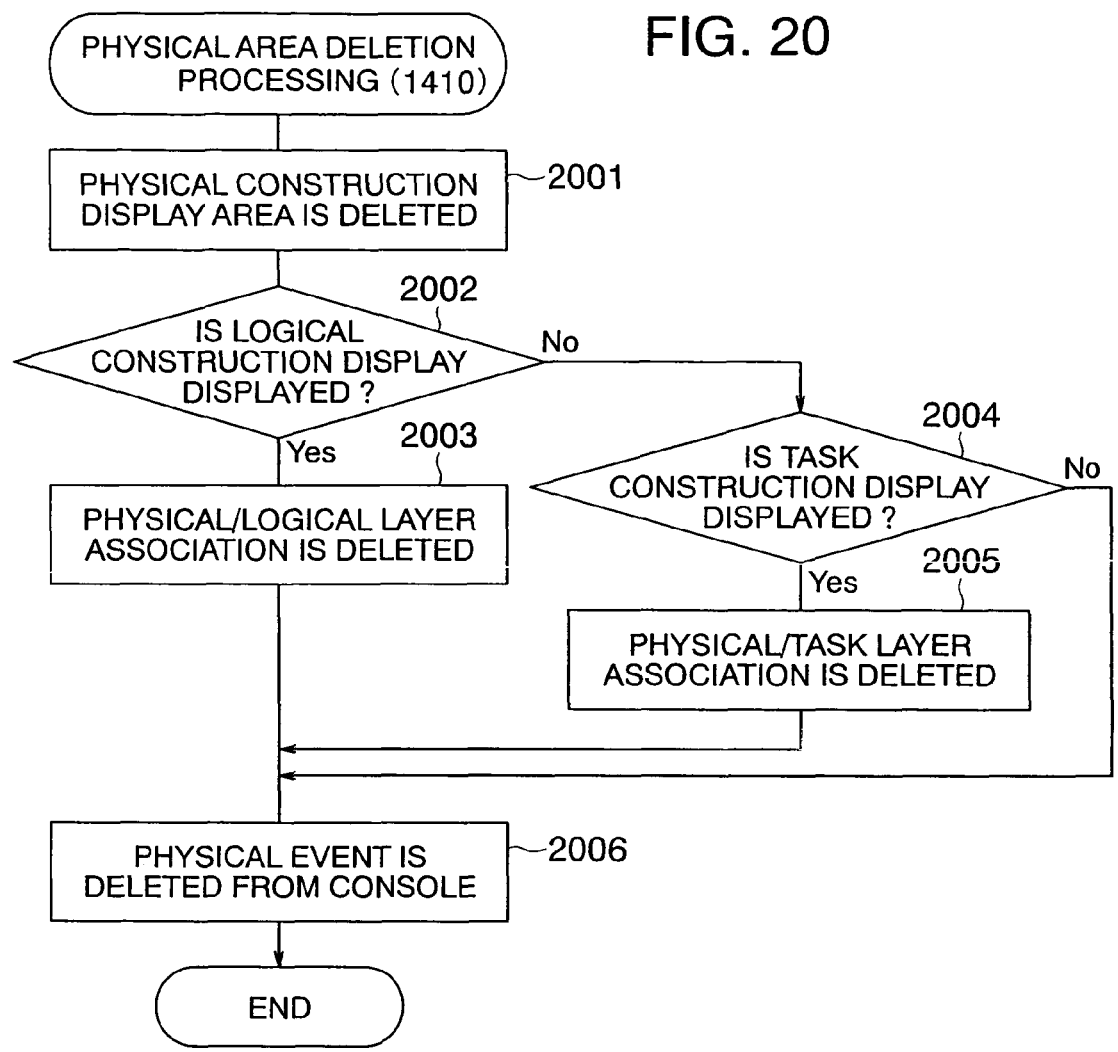
FIG. 20 shows the flow of a physical construction display area deletion processing according to the embodiment of the invention.

FIG. 20 shows the flow of the physical construction display area deletion processing according to the embodiment. The physical construction display area is deleted from the screen (2001) when the deletion request of the physical construction display area is received, and whether or not the logical construction display area is displayed is checked (2002).

The deletion line between the logical construction information and the physical construction information is deleted when the logical construction display area is displayed (2003). When the logical construction display area is not displayed, whether or not the task construction display area is displayed is checked (2004). When the task construction display area is displayed, the relation line between the task construction information and the physical construction information is deleted (2005). Next, the event corresponding to the physical construction information is deleted from the event console area (2006) and the processing is finished.

Figure 21:
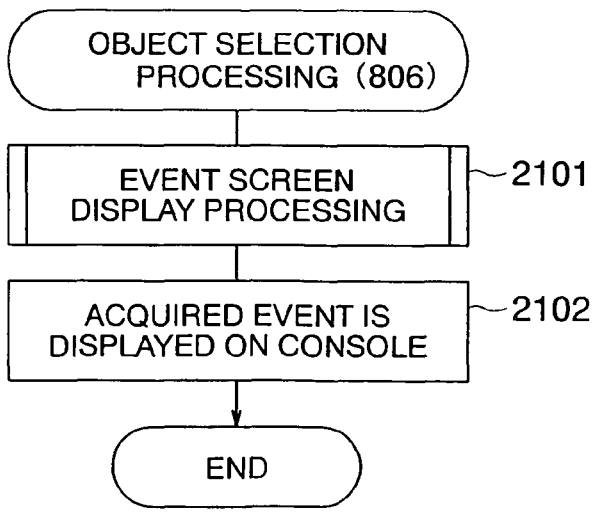
FIG. 21 shows a detail of an event filtering processing of selection construction information according to the embodiment of the invention.

FIG. 21 shows the detail of the event filtering processing of the selection construction information according to this embodiment. The event screen display processing (FIG. 10) is executed when the construction information is selected, the corresponding event is acquired (2101) and the message of the event is displayed in the event console area (2102).

Here, the flow is the one that acquires every time the event from the event DB 116. However, it is also possible to first acquire the event associated with the screen output construction information, then to hold the event as cache information and to retrieve the corresponding event from the cache when the selection request is received.

Figure 22:
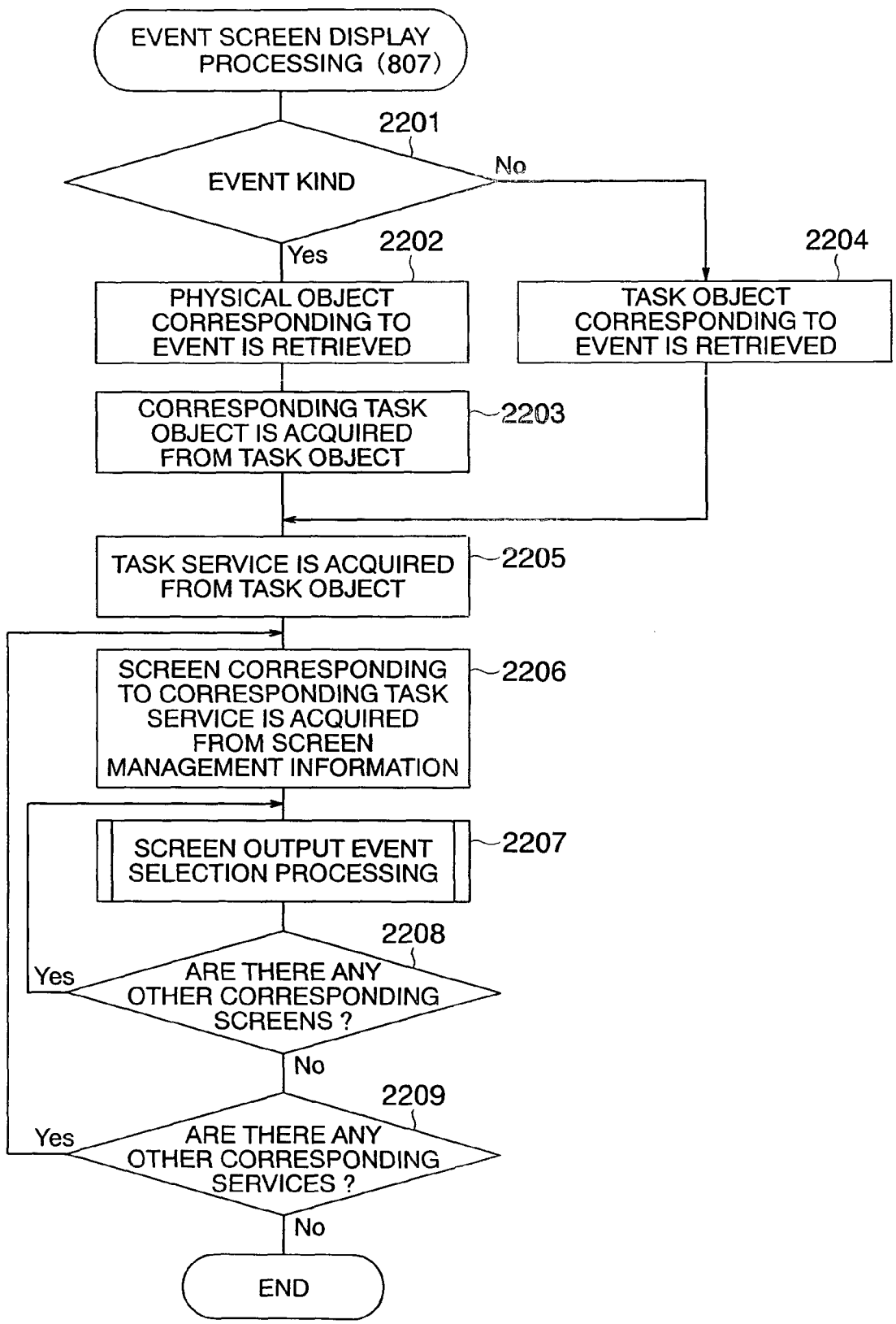
FIG. 22 shows a detail of an event screen display processing of according to the embodiment of the invention.

FIG. 22 shows the detail of the event screen display processing according to the embodiment. The kind of the event contained in the event information is judged when the event reception request is received (2201).

When the event kind judged is the physical event, the physical construction information corresponding to this event is retrieved (2202), the task construction information using this physical construction information is retrieved by the construction management processing unit 103 (2203) and the processing of step 2205 is executed. When the event is the task event, the task construction information corresponding to the event is retrieved (2204) and the processing of step 2205 is executed.

In step 2205, the construction management processing unit 103 looks up the task construction information 113 and acquires the task service name from the task construction information (2205). The screen control processing unit 101 looks up the screen management information 111 and acquires the screen information that makes the display corresponding to the task service name and moreover, for which the user makes log-in (2206). Next, the selection processing (FIG. 11) of the screen output event is executed and the message of the event is outputted to the event console area (2207).

When the screen corresponding to the event further exists, the processing of step 2207 is repeatedly executed (2208). When the task corresponding to the event further exists, the processing of step 2206 is repeatedly executed (2209). When the corresponding task services are all processed, the processing is finished.

Figure 23:
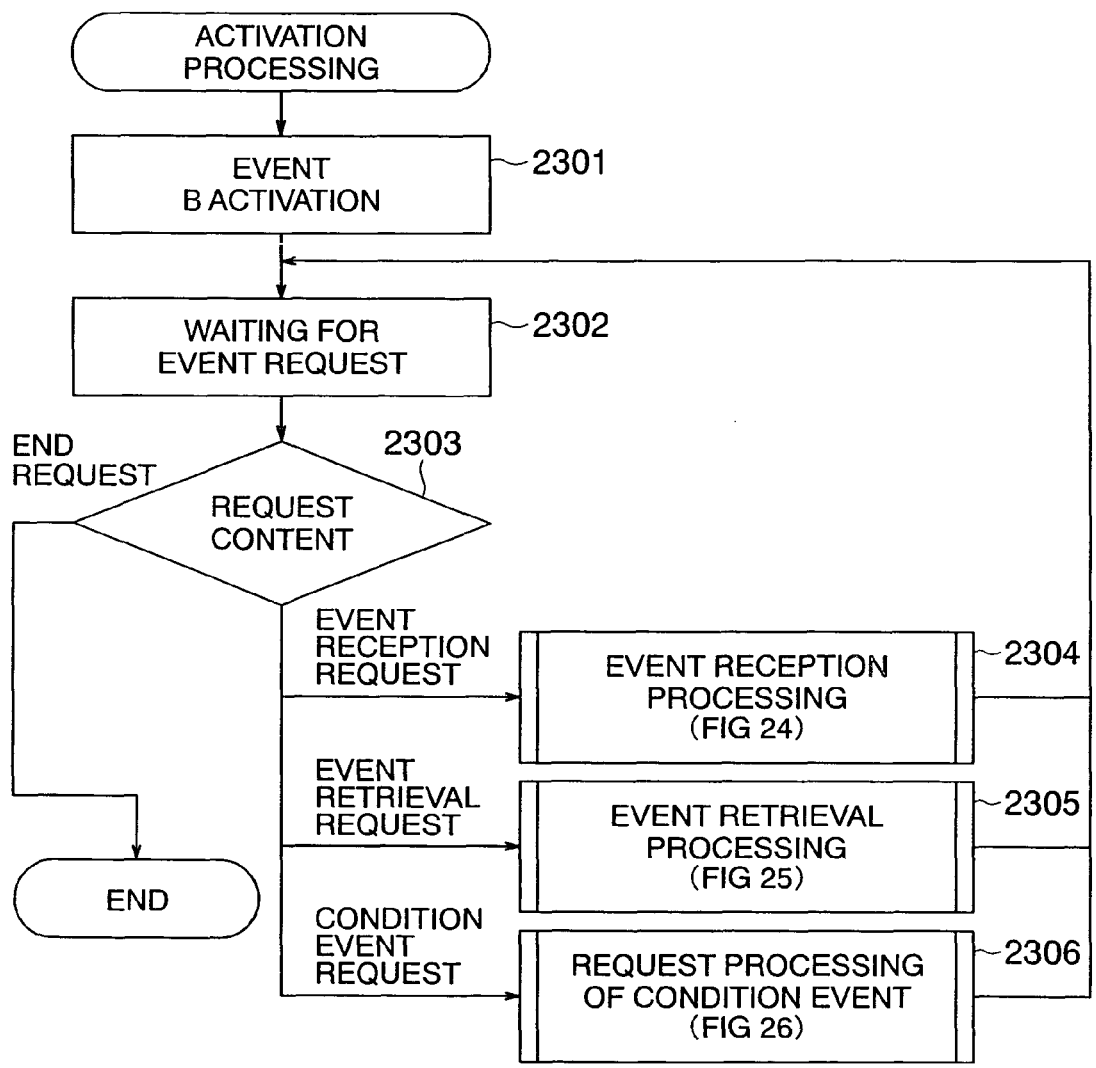
FIG. 23 shows a detail of an event processing unit 104 according to the embodiment of the invention.

FIG. 23 shows the detail of the event processing unit 104 according to the embodiment. When operated, the event processing unit 104 activates the processing program of the event DB 116 (2301) and enters the standby state until a request arrives.

When the request is received, the processing is allocated depending on the request content. The request includes "event reception request", "event retrieval request" and "status event request". The event reception processing (FIG. 24) is executed upon reception of "event reception request" and a processing for transferring the event to the screen control processing unit 101 is executed (2304). An event retrieval processing (FIG. 25) is executed and a processing for returning the event log registered to the event DB 116 to the requesting party is executed upon reception of "event retrieval request" (2305). A request processing of the status event (FIG. 26) is executed upon receipt of "status event request" and issuance of a status report event is asked to the agent (2306). The processing is finished by coming off from the loop when the end request is received.

Figure 24:
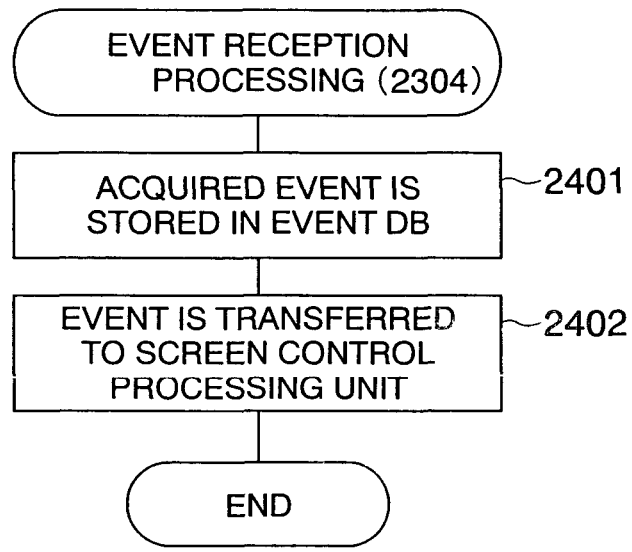
FIG. 24 shows a detail of an event reception processing according to the embodiment of the invention.

FIG. 24 shows the detail of the event reception processing according to the embodiment. When the event reception request is received, the information of the event received is stored in the event DB 116 (2401). The event is transferred to the screen control processing unit 101 (2402) and the processing is finished.

Figure 25:
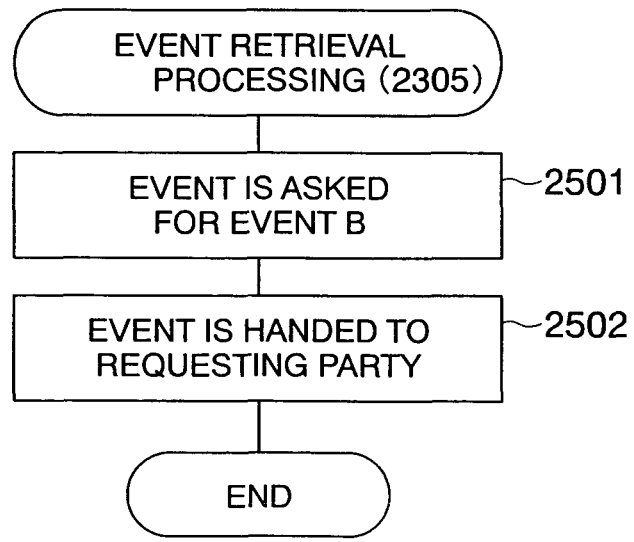
FIG. 25 shows a detail of an event retrieval processing according to the embodiment of the invention.

FIG. 25 shows the detail of the event retrieval processing according to the embodiment. When the event retrieval request is received, the event log registered to the event DB 116 is acquired (2501). The event information is delivered to the requesting party (2502) and the processing is finished.

Figure 26:
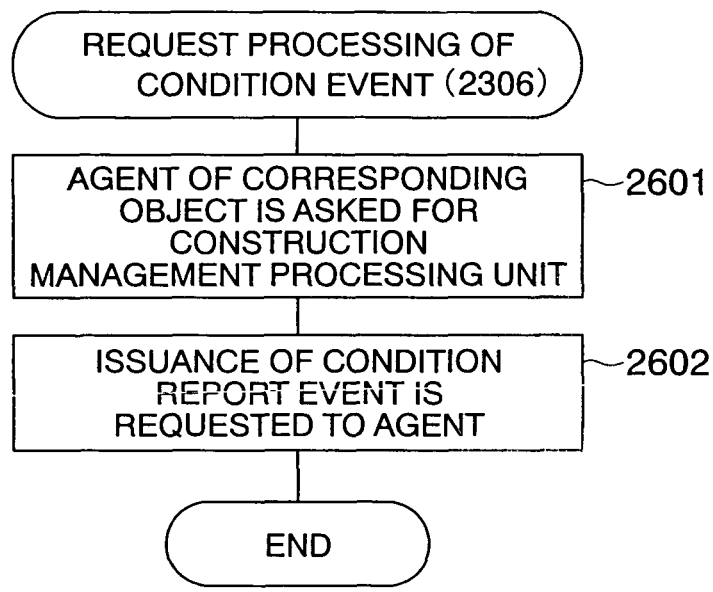
FIG. 26 shows a detail of a condition event request processing according to the embodiment of the invention.

FIG. 26 shows the detail of the status event request processing according to the embodiment. When the status event request of the construction information is received, the transmitting agent information of the corresponding construction information is asked to the construction management processing unit 103 (2601). The issuance of the status report event is requested through the communication processing unit 105 (2602) and the processing is finished.

Figure 27:
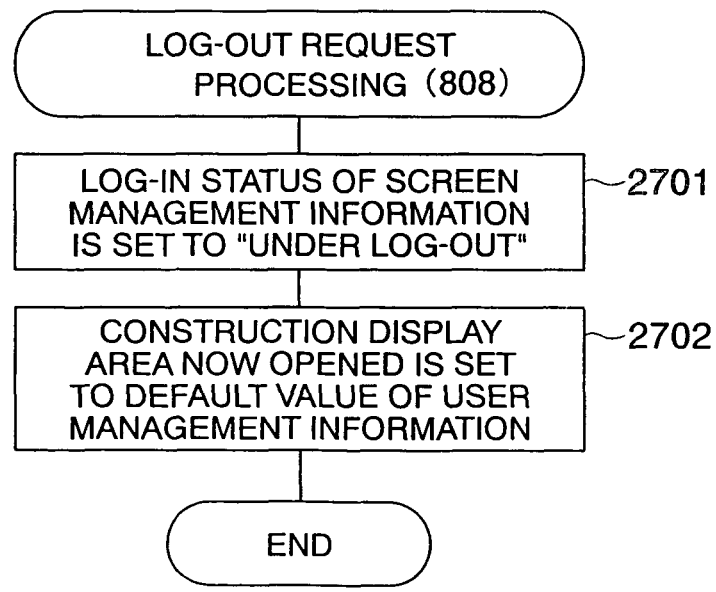
FIG. 27 shows an outline of a log-out processing (808) in the screen control processing unit 101 according to an embodiment of the invention.

FIG. 27 shows an outline of a log-out processing (808) in the screen control processing unit 101 according to the embodiment. The log-in status 404 of the screen management information 111 is set to "under log-out" when the log-out request of the user is received. Next, the construction display area that is now open is set to the default value of the user management information 112 and the processing is finished. Consequently, the construction display area at the time of log-out is displayed on the screen when log-on is made next time.

As explained above, this embodiment can display the screen from the user's viewpoint and can instantaneously switch the screen the user desires by switching of the layers. The embodiment automatically filters only the corresponding event when the screen is switched, and can automatically report the occurrence of a new event to the corresponding screen. Therefore, segmentation of the task influence range by the event can be made easily.

As described above, according to the information display system of this embodiment, the task construction information corresponding to the task, the logical construction information and the physical construction information are respectively displayed in the task construction display area, the logical construction display area and the physical construction display area inside the output area. Therefore, when any failure occurs in the computer system executing a plurality of tasks, it is possible to efficiently grasp the content of the failure and the range of influences brought forth by the failure.

According to the invention, it is possible to monitor tasks in a computer system executing a plurality of tasks or to grasp the content of failures or the range of influences brought forth by the failures when such failures occur in the computer system.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. An information output method effected via a management computer including a storage device and a processor, the information output method being for outputting information about a computer system, the computer system including physically-constructed computers, the information output method realized by executing a managing program in the processor, and the information output method comprising:

(A) storing, in the storage device, physical-construction information at least including a first set of identifiers, wherein each of the first set of identifiers is used to identify a physically-constructed computer;

(B) storing, in the storage device, logical construction information at least including a second set of identifiers, wherein each of the second set of identifiers is used to identify a logical element and a first set of relationship identifiers, wherein each of the first set of relationship identifiers is used to identify a relationship between a physically-constructed computer and a logical element, and wherein each logical element is a cluster group including at least one of the physically-constructed computers;

(C) storing, in the storage device, task construction information at least including a third set of identifiers and a second set of relationship identifiers, wherein each of the third set of identifiers is used to identify a task which is processed in the computer system, and wherein each of the second set of relationship identifiers is used to identify a relationship between a task and a logical element;

(D) storing, in the storage device, user management information for each user, wherein the user management information at least includes an object task containing a task service name representing the task as an object for each user, and outputting authorities for each user, about the task construction information, the logical construction information, and the physical-construction information;

(E) outputting, by the processor, at least two types of construction information selected from a set including the task construction information, the logical construction information, and the physical-construction information, based on the user management information and a log-in state of a user;

(F) outputting, by the processor, the second set of relationship identifiers, wherein each of the second set of relationship identifiers is used to identify a relationship, if the logical construction information and the task construction information are outputted, based on the user management information and a log-in state of a user; and (G) outputting, by the processor, the first set of relationship identifiers, wherein each of the first set of relationship identifiers is used to identify a relationship, if the logical construction information and the physical-construction information are outputted, based on the user management information and a log-in state of a user;

wherein the managing program is provided separately from programs executed by the physically-constructed computers to process tasks;

wherein an output area of an output unit is divided when construction display areas of any one of a task construction display area, a logical construction display area and a physical construction display area is displayed, and each of the task, logical and physical construction display areas is displayed in each of the divided output areas by the output unit;

wherein the task construction display area includes task icons for output of the task construction information;

wherein the logical construction display area includes logical construction icons for output of the logical construction information, and a logical construction icon corresponding to a task icon has a same shape as the task icon;

wherein the physical construction display area includes physical construction icons for output of the physical construction information, and a physical construction icon corresponding to the logical construction icon has a same shape as the logical construction icon;

wherein a relationship line representing a relationship between task icons, logical construction icons and physical construction icons is displayed by the output unit when construction display areas of any one of the task construction display area, the logical construction display area and the physical construction display area is displayed;

wherein the processor outputs a message of an physical event related to a physically-constructed computer by:

(1) outputting the message including an identifier of the physically-constructed computer, if the physical construction icon of the physically-constructed computer is selected on the output area, (2) outputting the message including an identifier of a logical element corresponding to the physically-constructed computer, if the logical construction icon of the logical element is selected on the output area, and (3) deciding that the identifier of the physically-constructed computer or the identifier of a logical element corresponding to the physically-constructed computer should be used based on a priority, wherein the priority is a display message priority for each user, and outputting the message including the decided identifier, if both of the physical construction icon of the physically-constructed computer and the logical construction icon of the logical element are not selected;

wherein a display attribute of construction information of the task construction display area, the logical construction display area or the physical construction display area, is changed by the output unit in accordance with a kind of event received from the computer system; and wherein save information representing a display content of an output area is stored in a storage device at a time of user's log-out, and display to the output area is made on a basis of the save information so stored at a time of next log-in.

2. An information output apparatus, comprising:

a management computer including a storage device and a processor, and configured to output information about a computer system, the computer system including physically-constructed computers configured to execute tasks;

wherein the management computer outputs information about the computer system when the processor executes a managing program that performs steps comprising:

(A) storing, in the storage device, physical-construction information at least including a first set of identifiers, wherein each of the first set of identifiers is used to identify a physically-constructed computer, (B) storing, in the storage device, logical construction information at least including a second set of identifiers, wherein each of the second set of identifiers is used to identify a logical element and a first set of relationship identifiers, wherein each of the first set of relationship identifiers is used to identify a relationship between a physically-constructed computer and a logical element, and wherein each logical element is a cluster group including at least one of the physically-constructed computers, (C) storing, in the storage device, task construction information at least including a third set of identifiers and a second set of relationship identifiers, wherein each of the third set of identifiers is used to identify a task which is processed in the computer system, and wherein each of the second set of relationship identifiers is used to identify a relationship between a task and a logical element, (D) storing, in the storage device, user management information for each user, wherein the user management information at least includes an object task containing a task service name representing the task as an object for each user, and outputting authorities for each user, about the task construction information, the logical construction information, and the physical-construction information, (E) outputting, by the processor at least two types of construction information selected from a set including the task construction information, the logical construction information, and the physical-construction information, based on the user management information and a log-in state of a user, (F) outputting, by the processor, the second set of relationship identifiers, wherein each of the second set of relationship identifiers is used to identify a relationship, if the logical construction information and the task construction information are outputted, based on the user management information and a log-in state of a user, and (G) outputting, by the processor, the first set of relationship identifiers, wherein each of the first set of relationship identifiers is used to identify a relationship, if the logical construction information and the physical-construction information are outputted, based on the user management information and a log-in state of a user;

wherein the managing program is provided separately from programs executed by the physically-constructed computers to process tasks;

wherein an output area of an output unit is divided when construction display areas of any one of a task construction display area, a logical construction display area and a physical construction display area is displayed, and each of the task, logical and physical construction display areas is displayed in each of the divided output areas by the output unit;

wherein the task construction display area includes task icons for output of the task construction information;

wherein the logical construction display area includes logical construction icons for output of the logical construction information, and a logical construction icon corresponding to a task icon has a same shape as the task icon;

wherein the physical construction display area includes physical construction icons for output of the physical construction information, and a physical construction icon corresponding to the logical construction icon has a same shape as the logical construction icon;

wherein a relationship line representing a relationship between the task icons, logical construction icons and physical construction icons is displayed by the output unit when construction display areas of any one of the task construction display area, the logical construction display area and the physical construction display area is displayed;

wherein the processor outputs a message of an physical event related to a physically-constructed computer by:

(1) outputting the message including an identifier of the physically-constructed computer, if the physical construction icon of the physically-constructed computer is selected on the output area, (2) outputting the message including an identifier of a logical element corresponding to the physically-constructed computer, if the logical construction icon of the logical element is selected on the output area, and (3) deciding that the identifier of the physically-constructed computer or the identifier of a logical element corresponding to the physically-constructed computer should be used based on a priority, wherein the priority is a display message priority for each user, and outputting the message including the decided identifier, if both of the physical construction icon of the physically-constructed computer and the logical construction icon of the logical element are not selected;

wherein a display attribute of construction information of the task construction display area, the logical construction display area or the physical construction display area, is changed by the output unit in accordance with a kind of event received from the computer system; and wherein save information representing a display content of an output area is stored in a storage device at a time of user's log-out, and display to the output area is made on a basis of the save information so stored at a time of next log-in.

3. A non-transitory computer-readable medium encoded with a program for execution in a processor of a management computer, the management computer also including a storage device, wherein when the program is executed by the processor of the management computer, the program causes the management computer to execute an information output method for outputting information about a computer system, the computer system configured to execute tasks by using physically-constructed computers, the information output method comprises:

(A) storing, in the storage device, physical-construction information at least including a first set of identifiers, wherein each of the first set of identifiers is used to identify a physically-constructed computer, (B) storing, in the storage device, logical construction information at least including a second set of identifiers, wherein each of the second set of identifiers is used to identify a logical element and a first set of relationship identifiers, wherein each of the first set of relationship identifiers is used to identify a relationship between a physically-constructed computer and a logical element, and wherein each logical element is a cluster group including at least one of the physically-constructed computers, (C) storing, in the storage device, task construction information at least including a third set of identifiers and a second set of relationship identifiers, wherein each of the third set of identifiers is used to identify a task which is processed in the computer system, and wherein each of the second set of relationship identifiers is used to identify a relationship between a task and a logical element, (D) storing, in the storage device, user management information for each user, wherein the user management information at least includes an object task containing a task service name representing the task as an object for each user, and outputting authorities for each user, about the task construction information, the logical construction information, and the physical-construction information, (E) outputting, by the processor, at least two types of construction information selected from a set including the task construction information, the logical construction information, and the physical-construction information, based on the user management information and a log-in state of a user, (F) outputting, by the processor, the second set of relationship identifiers, wherein each of the second set of relationship identifiers is used to identify a relationship, if the logical construction information and the task construction information are outputted, based on the user management information and a log-in state of a user, and (G) outputting, by the processor, the first set of relationship identifiers, wherein each of the first set of relationship identifiers is used to identify a relationship, if the logical construction information and the physical-construction information are outputted, based on the user management information and a log-in state of a user;

wherein the managing program is provided separately from programs executed by the physically-constructed computers to process tasks;

wherein an output area of an output unit is divided when construction display areas of any one of a task construction display area, a logical construction display area and a physical construction display area is displayed, and each of the task, logical and physical construction display areas is displayed in each of the divided output areas by the output unit;

wherein the task construction display area includes task icons for output of the task construction information;

wherein the logical construction display area includes logical construction icons for output of the logical construction information, and a logical construction icon corresponding to a task icon has a same shape as the task icon;

wherein the physical construction display area includes physical construction icons for output of the physical construction information, and a physical construction icon corresponding to the logical construction icon has a same shape as the logical construction icon;

wherein a relationship line representing a relationship between the task icons, logical construction icons and physical construction icons is displayed by the output unit when construction display areas of any one of the task construction display area, the logical construction display area and the physical construction display area is displayed;

wherein the processor outputs a message of an physical event related to a physically-constructed computer by:

(1) outputting the message including an identifier of the physically-constructed computer, if the physical construction icon of the physically-constructed computer is selected on the output area, (2) outputting the message including an identifier of a logical element corresponding to the physically-constructed computer, if the logical construction icon of the logical element is selected on the output area, and (3) deciding that the identifier of the physically-constructed computer or the identifier of a logical element corresponding to the physically-constructed computer should be used based on a priority, wherein the priority is a display message priority for each user, and outputting the message including the decided identifier, if both of the physical construction icon of the physically-constructed computer and the logical construction icon of the logical element are not selected;

wherein a display attribute of construction information of the task construction display area, the logical construction display area or the physical construction display area, is changed by the output unit in accordance with a kind of event received from the computer system; and wherein save information representing a display content of an output area is stored in a storage device at a time of user's log-out, and display to the output area is made on a basis of the save information so stored at a time of next log-in.

* * * * *